United States Patent
Wehrman et al.

(10) Patent No.: US 11,926,906 B2
(45) Date of Patent: Mar. 12, 2024

(54) PROCESS AND APPARATUS FOR COMPRESSING HYDROGEN GAS IN A CENTRIFUGAL COMPRESSOR

(71) Applicant: Air Products and Chemicals, Inc., Allentown, PA (US)

(72) Inventors: Joseph Gerard Wehrman, Macungie, PA (US); Paul Higginbotham, Surrey (GB); Vincent White, Surrey (GB)

(73) Assignee: AIR PRODUCTS AND CHEMICALS, INC., Allentown, PA (US)

( * ) Notice: Subject to any disclaimer, the term of this patent is extended or adjusted under 35 U.S.C. 154(b) by 348 days.

(21) Appl. No.: 17/201,293

(22) Filed: Mar. 15, 2021

(65) Prior Publication Data
US 2022/0290309 A1    Sep. 15, 2022

(51) Int. Cl.
| | | |
|---|---|---|
| C25B 1/04 | (2021.01) | |
| C25B 1/50 | (2021.01) | |
| C25B 9/70 | (2021.01) | |
| C25B 15/02 | (2021.01) | |
| C25B 15/08 | (2006.01) | |
| F04D 17/12 | (2006.01) | |

(Continued)

(52) U.S. Cl.
CPC ............... *C25B 1/04* (2013.01); *C25B 1/50* (2021.01); *C25B 9/70* (2021.01); *C25B 15/02* (2013.01); *C25B 15/083* (2021.01); *F04D 17/12* (2013.01); *F17C 5/06* (2013.01); *F17C 2221/012* (2013.01); *F17C 2227/0157* (2013.01); *F28C 1/00* (2013.01)

(58) Field of Classification Search
CPC ... F04D 17/12; C25B 1/04; C25B 1/50; F04B 25/00
See application file for complete search history.

(56) References Cited

U.S. PATENT DOCUMENTS

| | | |
|---|---|---|
| 3,401,111 A | 9/1968 | Jackson |
| 3,801,708 A | 4/1974 | Smith et al. |

(Continued)

FOREIGN PATENT DOCUMENTS

| | | |
|---|---|---|
| CN | 111498868 A | 8/2020 |
| EP | 3789616 A1 | 3/2021 |

(Continued)

OTHER PUBLICATIONS

Haoyu Yin, et al., "Performance analysis of the water-injected centrifugal vapor compressor", Elsevier, Energy 200, 2020, 1-16.

*Primary Examiner* — Courtney D Heinle
*Assistant Examiner* — Andrew J Marien
(74) *Attorney, Agent, or Firm* — Matthew Richard Weaver

(57) ABSTRACT

A process for producing compressed hydrogen gas, said process comprising electrolysing water to produce hydrogen gas and compressing said hydrogen gas in a multistage compression system to produce compressed hydrogen gas. The multistage compression system comprises at least one centrifugal compression stage, and the hydrogen gas is fed to the centrifugal compression stage at a pre-determined feed temperature and pressure and having a pre-determined relative humidity. The process further comprises adding water and heat to the hydrogen gas upstream of the centrifugal compression stage, as required, to humidify the hydrogen gas to the pre-determined relative humidity.

33 Claims, 5 Drawing Sheets

(51) Int. Cl.
*F17C 5/06* (2006.01)
*F28C 1/00* (2006.01)

(56) References Cited

U.S. PATENT DOCUMENTS

| | | | |
|---|---|---|---|
| 3,992,167 | A | 11/1976 | Beddome |
| 9,441,542 | B2 | 9/2016 | Zhang et al. |
| 2011/0210008 | A1* | 9/2011 | Kumarasamy ......... F02M 21/00 |
| | | | 204/241 |
| 2012/0194604 | A1* | 8/2012 | Tamaki ................... B41J 2/165 |
| | | | 347/22 |
| 2016/0001215 | A1* | 1/2016 | Vanzandt ............. B01D 53/047 |
| | | | 422/162 |
| 2020/0343567 | A1* | 10/2020 | Wakita .................... C25B 15/08 |
| 2021/0332488 | A1* | 10/2021 | Sakai ................. H01M 8/0656 |

FOREIGN PATENT DOCUMENTS

| | | |
|---|---|---|
| JP | 2075882 | 3/1990 |
| WO | 2010111357 A2 | 9/2010 |

\* cited by examiner

PROCESS AND APPARATUS FOR COMPRESSING HYDROGEN GAS IN A CENTRIFUGAL COMPRESSOR

TECHNICAL FIELD

The present invention relates to the compression of hydrogen gas using centrifugal compressors. The present invention is particularly concerned with ways to increase water vapour levels in hydrogen gas being fed to a centrifugal compression stage of a multistage compression system.

BACKGROUND

Positive-displacement compressors, such as reciprocating compressors, are typically used in industrial processes to compress hydrogen gas. This type of compressor works by confining successive volumes of gas within a closed space, such as by using a piston driven by a crankshaft to deliver gases at high pressure.

The performance of positive-displacement compressors, such as reciprocating compressors, is typically uniform for gaseous media of both a very low molecular weight and a high molecular weight. This type of compressor is therefore suitable for a range of gases and is particularly suitable for the compression of hydrogen gas. However, these types of compressors are not preferred for handling large volumes of gas. In order to do so, a large number of compressors must be used in parallel due to the structure of these types of compressors. This results in considerable capital expense and operating costs.

In contrast, centrifugal compressors are a type of dynamic compressor, in which gas is compressed by mechanical action of rotating vanes or impellers which impart velocity to the gas. Gas typically enters at the centre of the impellers and is propelled out to the radial edges under rotary motion to deliver gases at high velocity which impact the casing. The velocity of the gas is converted to a static pressure to deliver high pressure gases. These types of compressors are typically more suited to handling large volumes of gases at lower costs.

However, these compressors are typically not suitable for compressing low molecular weight gases, such as hydrogen. This is because it is more difficult to establish sufficient centrifugal force due to the lower density of the gas, making high-pressure compression more difficult.

Therefore, for centrifugal compression, the pressure ratio (the discharge pressure divided by the inlet pressure, for a particular stage of compression) is highly sensitive to, and dependent on, the molecular weight of the gas being compressed. That is, centrifugal compression of a gas with a low molecular weight may result in a discharge pressure at the outlet which is lower than the specified pressure, unless additional impellers are used.

Typically, in order to compress a low molecular weight gas in a centrifugal compression system, such a system must be designed with many more impellers in series to accommodate the reduced gas density. This design substantially increases the cost of the compression system and is undesirable due to the inherent mechanical constraints of such a system.

There is therefore a desire in the art to provide a solution which will allow centrifugal compression systems to maintain pressure ratios in an efficient way when used with low molecular weight gases, without dramatically increasing costs.

At present, the inventors are not aware of any prior art which addresses this issue in the context of compressing wet hydrogen gas in centrifugal compressors.

SUMMARY

According to a first aspect of the present invention, there is provided a process for producing compressed hydrogen gas, said process comprising:
electrolysing water to produce hydrogen gas; and
compressing said hydrogen gas in a multistage compression system to produce compressed hydrogen gas,
wherein the multistage compression system comprises at least one centrifugal compression stage, and the hydrogen gas is fed to the centrifugal compression stage at a pre-determined feed temperature and pressure and having a pre-determined relative humidity, and
wherein the process comprises adding water and heat to the hydrogen gas upstream of the centrifugal compression stage, as required, to humidify the hydrogen gas to the pre-determined relative humidity.

According to a second aspect of the present invention, there is provided an apparatus for producing compressed hydrogen gas, the apparatus comprising:
a plurality of electrolysers arranged in parallel for electrolysing water to provide hydrogen gas;
an electricity generation system for generating electricity to power the plurality of electrolysers, the electricity generation system being in electrically conductive communication with the plurality of electrolysers;
a multistage compression system for compressing the hydrogen gas to provide a compressed hydrogen gas, the multistage compression system comprising a feed end, an outlet end and at least one centrifugal compression stage having a pre-determined feed temperature and pressure and pre-determined relative humidity, the feed end being in fluid flow communication with the plurality of electrolysers via a feed header;
a saturator for adding water and heat to the hydrogen gas upstream of the centrifugal compression stage as required for humidifying the hydrogen gas to the pre-determined relative humidity at the pre-determined feed temperature and pressure; and
a separator for removing excess liquid water from the hydrogen gas upstream of the centrifugal compression stage.

DETAILED DESCRIPTION

The term "hydrogen gas" may be used herein to refer to hydrogen gas before and/or after it has had water and heat added to it (i.e. before or after humidification).

The process of the present invention includes adding heat and water, as required, to humidify hydrogen gas to a pre-determined relative humidity (at a pre-determined feed temperature and pressure). The relative humidity can be determined from the absolute humidity (i.e. mass concentration of water vapour) of hydrogen gas. The absolute humidity of the hydrogen gas is independent of its temperature or pressure. However, the relative humidity of hydrogen gas will depend on its temperature and pressure. The term "pre-determined" when used with respect to the feed temperature and pressure of a stage of compression, is intended to refer to the feed conditions selected for the hydrogen gas as it is fed to that particular stage of compression. These conditions will vary depending on whether the stage is an initial, intermediate, or final stage of compression, for example. By way of an example, a multistage compression system with four stages may have predetermined feed pressures of 1.1, 2.5, 6, and 13.6 bar at the inlet to each stage respectively, and the predetermined feed temperature at the inlet to each stage may be 40° C.

The pre-determined feed conditions for each stage may be selected for the particular design of the multistage compression system, the pressure of the gas entering the system, and/or the required discharge pressure for the outlet of the multistage compression system, for example where a downstream process requires gas of a specified pressure.

Thus, for any references herein to the "pre-determined relative humidity", "pre-determined feed temperature" and "pre-determined feed pressure" of hydrogen gas for a stage of compression, it will be appreciated that these refer to the conditions of said hydrogen gas at the point at which it is fed to the centrifugal compression stage, i.e. not before this point.

This is because at various points in the system before the hydrogen gas is fed to the stage of compression, the conditions of said hydrogen gas may not yet be at the pre-determined conditions (temperature, pressure and relative humidity). The present process as described herein serves to provide the hydrogen gas at these pre-determined feed conditions, and so in particular, when relative humidity is discussed it is always described (unless expressly stated otherwise) as if it was measured at the feed temperature and pressure, which are pre-determined for that stage of compression. The terms "pre-determined feed conditions" or simply "feed conditions" or "inlet conditions" may be used herein to refer to the pre-determined feed temperature and pre-determined feed pressure.

Since the pre-determined feed conditions vary according to the stage of compression concerned, it will be appreciated that the present invention could be implemented in various multistage compression systems, irrespective of the pre-determined feed temperature and pressure for each stage.

The term "absolute humidity" is used to refer to the mass of water vapour present in unit volume of gas, typically measured in units of grams of water per cubic metre of gas (g m$^{-3}$). The value for absolute humidity is independent of temperature and pressure and corresponds to the mass concentration of water vapour in a volume of hydrogen gas.

The terms "mole fraction of water" or "water mole fraction" in the context of the present invention, is used to refer to the molar amount of water vapour present in the hydrogen gas, divided by the total molar amount of all constituents in the hydrogen gas, expressed as a dimensionless quantity (mol/mol).

The term "relative humidity" is used herein to refer to the relative level of saturation of hydrogen gas with water vapour at a given temperature and pressure and indicates the concentration of water present in the gas phase relative to a fully water-saturated hydrogen gas.

One way in which the relative humidity of hydrogen gas could be determined is by measuring absolute humidity (the mass of water vapour present in unit volume of hydrogen gas) and then calculating relative humidity from a standard water saturation curve (e.g. steam tables). The absolute humidity can be measured using methods known in the art, such as by using an infrared spectrometer or a dewpoint meter, for example.

By way of background, the relative humidity of a gas can be described using the following equation:

$$\% \text{ Relative humidity} = \frac{\text{actual vapour pressure of water}}{\text{saturation vapour pressure of water}} \times 100\%$$

For example, if the actual vapour pressure of water is 0.5 bar, compared to a saturation vapour pressure of water of 1.0 bar when mixed with hydrogen gas at a particular temperature and pressure, then the relative humidity would be 50%.

The "actual vapour pressure" of water is the part of the total pressure contributed by the water vapour, typically expressed in units of Pa or bar. The "saturation vapour pressure" of water is the maximum pressure of gaseous water that can exist at a given temperature, typically expressed in units of Pa or bar.

It will be appreciated that the actual vapour pressure and saturation vapour pressure of water are dependent upon conditions of the feed. For example, saturation vapour pressure is dependent upon temperature, whereas actual water vapour pressure is dependent upon pressure (and mole fraction of water in the gas). So, the saturation vapour pressure corresponds to the maximum concentration of water vapour that can be present in a gas for a given temperature, whereas the actual vapour pressure corresponds to the measured mole fraction of water in the gas at a given pressure.

Generally, the higher the temperature, the higher the saturation vapour pressure of water, and vice versa. By way of an example, near room temperature the air's capacity to "hold" water vapour doubles for every 10° C. increase in temperature. The steepness of this variation gradually changes across the temperature range (see FIG. 5).

It will be appreciated that the saturation vapour pressures of water vapour in hydrogen gas will differ slightly from those of water vapour in air but would be understood by one skilled in the art to follow the same general trend.

In addition, generally the higher the total pressure (or mole fraction of water), the higher the actual vapour pressure of water, and vice versa. For example, doubling of the total pressure yields a similar doubling of the actual vapour pressure of water, and so if the saturation vapour pressure remains unchanged (i.e. if temperature is unchanged) then a relative humidity of 40% would be doubled to 80%.

As can be seen from the above equation, when the actual vapour pressure of water in a gas is equal to the saturation vapour pressure of water, the relative humidity of the gas phase will equal 100%, i.e. it will be fully saturated with water vapour. In this state, the rate of evaporation and rate of condensation of water will be roughly in equilibrium.

If a gas is gradually cooled, where the mole fraction of water in the gas remains constant, the saturation vapour pressure will decrease, and the relative humidity at that reduced temperature will rise until it reaches 100%. The temperature at which this occurs is sometimes called the "dew point". If the gas is cooled further, some of the water vapour will start to condense (i.e. actual vapour pressure decreases) in order to maintain the relative humidity at 100% for the reduced temperature. When this happens, the rate of condensation exceeds the rate of evaporation of water.

It will be appreciated that, in the context of a multistage compression system where the temperature and pressure of gas changes across stages, that the relative humidity (%) at a particular point in the system may be different even though the mole fraction of water in the gas is the same. This is because the change in conditions of the gas results in a corresponding change in the actual vapour pressure or saturation vapour pressure of water. The result of this is that the dew point and relative humidity of a gas at one temperature and pressure will not be the same for that gas at a different temperature and pressure, despite each having the same mole fraction of water.

Since the value for relative humidity is highly sensitive to temperature and pressure, the term "relative humidity" as used herein is always used to refer to the relative humidity of the hydrogen gas when measured at the pre-determined feed temperature and pressure for the particular stage of compression in the multistage compression system, unless it is expressly stated otherwise.

The term "apparent molecular weight" in the context of the present invention is intended to mean the molecular weight of a gaseous medium having an admixture of low and high molecular weight constituents. The apparent molecular weight of a gas mixture can be measured, or alternatively can estimated by calculating the sum of the products of the mole fractions of each component times the molecular weight of that component, i.e.

$$M_{app} = \Sigma(M_A \times y_A + M_B \times y_B + \ldots)$$

for a mixture of gases A+B+ ..., where $M_X$ is the molecular weight of a component gas X, and $y_X$ is the mole fraction of the component gas X.

The term "suitable" in the context of pressure reduction is intended to mean that the pressure of the hydrogen gas is reduced to an appropriate extent having regard to the inlet pressure of the stage of the multistage compression system to which the reduced pressure hydrogen gas is fed.

In the following discussion of embodiments of the present invention, the pressures given are absolute pressures unless otherwise stated.

According to a first aspect of the present invention, there is provided a process for producing compressed hydrogen gas.

The first step in the process involves electrolysing water to produce hydrogen gas. The second step in the process involves compressing the hydrogen gas in a multistage compression system to produce compressed hydrogen gas.

In the process of the present invention, the multistage compression system comprises at least one centrifugal compression stage, and the hydrogen gas is fed to the centrifugal compression stage at a pre-determined feed temperature and pressure and having a pre-determined relative humidity.

Accordingly, the present invention relates to using centrifugal compressors to compress hydrogen gas produced by electrolysis. Hydrogen gas produced from electrolysis of water will contain impurities. In particular, hydrogen gas produced by electrolysis will be saturated with water. Hydrogen gas produced in this way is often called "wet" hydrogen gas.

Pure hydrogen gas has a molecular weight (in g/mol) of 2.016. However, wet hydrogen gas generated by electrolysis of water will typically be saturated with water. Water has a molecular weight of 18.015 which is significantly higher than that of hydrogen gas. Therefore, "wet" hydrogen gas has a higher "apparent" molecular weight than pure hydrogen gas, typically around 3 but necessarily somewhere between the molecular weight of pure hydrogen and pure water, 2.016 and 18.015 respectively, depending on the mole fraction of water in the gas. Thus, in some embodiments, the hydrogen gas generated by electrolysis of water will have an apparent molecular weight of from about 2.5 to about 4, or from about 2.5 to about 3.5.

When water-saturated compressed hydrogen gas passes through the inter-coolers and after-coolers of a multistage compression system, water will be removed from the hydrogen gas via condensation of the gaseous water and phase separation of liquid water. This removal of water from the hydrogen gas in turn causes the apparent molecular weight of the hydrogen gas to decrease as the heavier water molecules are extracted and the hydrogen gas is dried. As water is removed, the apparent molecular weight of the hydrogen gas approaches that of pure hydrogen, 2.016.

As mentioned above, in centrifugal compressors the pressure ratio (the discharge pressure divided by the inlet pressure for a stage of compression) is highly sensitive to, and dependent on, the molecular weight of the gas being compressed.

This change in apparent molecular weight due to the drying of wet hydrogen gas between stages in a multistage compression system may result in less than optimal performance of the centrifugal compressors that the dry hydrogen gas may be subsequently fed to, resulting in discharge pressures below the specified pressure.

For example, conventional centrifugal compressors may include recycle systems which circulate a portion of hydrogen gas from a cooler at the outlet end to the feed end of a compression stage. Recycle systems are useful for preventing compressor surge during periods where the source hydrogen gas mass flow which is below a minimum threshold for normal compressor operation.

The compressed hydrogen gas discharged from the outlet end is at a higher temperature and pressure compared with the hydrogen gas at the inlet end. It is cooled in a cooler and the temperature reduced, which results in the saturation vapour pressure of water decreasing. The result of this is that in order to preserve the relative humidity at about 100% for the reduced temperature, water vapour condenses and is removed from the compressed hydrogen gas. The mole fraction of water in the cooled hydrogen gas has therefore been reduced.

Therefore, during situations where hydrogen gas is being recycled in this way, the recycled hydrogen gas has a reduced apparent molecular weight that, once added to the fresh wet hydrogen feed, will reduce the overall apparent molecular weight of the hydrogen gas being fed to the compression stage. As explained above, the reduction of the apparent molecular weight of the gas may result in less than optimal performance of a centrifugal compressor.

Table 1 below demonstrates this effect. In particular, it can be seen that the removal of water vapour between stages, and thus the reduction in apparent molecular weight, results in a reduction of the pressure ratio upon recycling.

TABLE 1

| Centrifugal Hydrogen compression | | | | | |
| --- | --- | --- | --- | --- | --- |
| Stage no. | 1 | 2 | 3 | 4 | 4 |
| Normal feed, 30 bar discharge pressure | | | | | |
| Location | Inlet | Inlet | Inlet | Inlet | outlet |
| Stage inlet pressure (bar) | 1.1 | 2.5 | 6 | 13.6 | 30 |
| Stage inlet relative humidity | 100% | 100% | 100% | 100% | 100% |

TABLE 1-continued

Centrifugal Hydrogen compression

| Stage no. | 1 | 2 | 3 | 4 | 4 |
|---|---|---|---|---|---|
| Stage inlet temp (° C.) | 40 | 40 | 40 | 40 | 40 |
| Water mole fraction | 0.067 | 0.030 | 0.012 | 0.005 | 0.002 |
| Apparent molecular weight | 3.089 | 2.488 | 2.213 | 2.103 | 2.055 |
| Full recycle | | | | | |
| Stage inlet relative humidity | 44% | 42% | 44% | 45% | — |
| Stage inlet temp (° C.) | 40 | 40 | 40 | 40 | — |
| Water mole fraction | 0.030 | 0.012 | 0.005 | 0.002 | — |
| Apparent molecular weight | 2.488 | 2.213 | 2.103 | 2.055 | — |
| Head ratio | 0.806 | 0.889 | 0.950 | 0.977 | — |
| Ratio of pressure ratios (full recycle vs full flow) | 0.867 | 0.918 | 0.965 | 0.984 | — |
| Discharge pressure on recycle with same inlet pressure | 2.167 | 5.510 | 13.122 | 29.532 | — |
| Speed change needed to maintain pressure ratio | 1.114 | 1.060 | 1.026 | 1.011 | — |

For example, hydrogen gas is compressed in stage 1 to the specified discharge pressure of 2.5 bar (at the inlet to stage 2). Between stage 1 and 2 the gas loses water (0.067 to 0.030 water mole fraction), and so has a reduced apparent molecular weight (3.089 to 2.488 mol. wt.). This gas is then removed from the inlet of stage 2 and recycled back through stage 1 with these characteristics and the discharge pressure for stage 1 for the recycled gas is 2.167 bar. This is much lower than the specified pressure of 2.5 bar.

Table 1 also demonstrates how the relative humidity of a gas at one temperature and pressure will not be the same for that gas at a different temperature and pressure, but with the same mole fraction of water.

For example, for the pre-determined feed temperature and pressure at the inlet to stage 2, where the hydrogen gas has a water mole fraction 0.030, the relative humidity under these conditions is 100%. Yet for that same feed at the predetermined feed temperature and pressure at the inlet for stage 1, the relative humidity under these conditions is 44%, even though the water mole fraction remains unchanged.

As explained in more detail below, there may be situations where the amount of hydrogen gas produced from electrolysis is variable, and so at least some, or possibly all, of the hydrogen gas supplied to the centrifugal compressor will be dry hydrogen gas obtained from storage. In these instances, the apparent molecular weight of the hydrogen gas entering the centrifugal compressor will be lower than is required for optimal performance.

Accordingly, there is a need in the art for solutions to address the problem of reduced apparent molecular weight when compressing hydrogen gas produced by electrolysis in centrifugal compressors.

The present invention addresses this problem by adding water and heat to the hydrogen gas upstream of the centrifugal compression stage as required to humidify the hydrogen gas to the pre-determined relative humidity. In other words, humidified such that the hydrogen gas being fed to the centrifugal compression stage is at the pre-determined relative humidity at the compression stage inlet conditions (i.e. pre-determined feed temperature and pressure).

Electrolysis

A method according to the present invention comprises electrolysing water to produce hydrogen gas. Any suitable form of water electrolysis may be used including alkaline water electrolysis and polymer electrolyte membrane (PEM) water electrolysis.

The water used for the electrolysis may be sea water that has been desalinated, possibly by reverse osmosis, and demineralised.

The electricity required for the electrolysis may be generated from one or more suitable energy sources, including but not limited to, renewable energy sources, onsite petrol-, diesel- or hydrogen-powered generator(s), fuel cells, or taken from a local or national grid, or combinations of these sources.

Preferably, at least some of the electricity required for the electrolysis may be generated from a renewable energy source including wind energy, solar energy, tidal energy and hydroelectric energy, or combinations of these sources, particularly wind energy and solar energy. The electricity generated from these sources is used to provide power to the electrolysers.

Preferably, the process will be self-contained in terms of power generation for the electrolysis. Thus, preferably the entire electricity demand for the electrolysis is met using renewable power sources.

It is envisaged, however, that electricity generated from one or more renewable energy sources may be supplemented by other sources either during periods of particularly high demand for product(s) from a downstream process(es) and/or during periods when the renewable power source is only available below the threshold required to meet demand, or is not available at all. In these cases, additional electricity may be taken from onsite battery storage and/or generated from one or more onsite petrol-, diesel- or hydrogen-powered generator(s), including fuel cells and/or taken from a local or national grid.

The electrolysis can be carried out at any suitable scale. In some embodiments, however, the electrolysis may have a total capacity of at least 1 gigawatt (GW). The maximum total capacity of the electrolysis is limited only by practical considerations, e.g. generating sufficient power from renewable energy sources to power the plurality of electrolysers. Thus, the electrolysis may have a maximum total capacity of about 10 GW or more. The total capacity of the electrolysis may be from 1 GW to about 5 GW, e.g. from about 1.5 GW to about 3 GW.

The hydrogen gas is typically generated by the electrolysis at pressure slightly higher than atmospheric pressure, e.g. about 1.3 bar. However, in some embodiments, the electrolysis produces hydrogen at a somewhat higher pressure, for example up to about 3 bar.

Thus, hydrogen gas is usually fed to the multistage compression system at a pressure in the range from atmospheric pressure to about 3 bar, preferably in the range from atmospheric pressure to about 1.5 bar, e.g. about 1.1 bar.

Purification

It will be appreciated that hydrogen gas produced from electrolysis of water will contain impurities. Therefore, the term "hydrogen gas" when used in the context of the present invention is intended to refer to hydrogen gas with such impurities, unless and until the hydrogen gas is purified.

In particular, this term includes hydrogen gas produced by electrolysis which is typically saturated with water at 40° C. and usually contains some residual oxygen gas, typically about 500 to about 1000 ppm(v). These impurities will usually have to be removed, depending on the tolerances of any downstream process(es).

For example, oxygen is a poison for conventional catalysts used in the Haber process. Thus, if the compressed hydrogen gas is intended to be used in a downstream process that is ammonia synthesis, the feed to the catalyst will contain less than about 10 ppm, typically less than about 5 ppm, total oxygen, i.e. oxygen atoms from any impurity source such as oxygen gas ($O_2$), water ($H_2O$), carbon monoxide (CO) and/or carbon dioxide ($CO_2$). Accordingly, the feed will also be dry, i.e. no more than 1 ppm water.

Downstream processes using conventional "grey" hydrogen (i.e. hydrogen derived from a hydrocarbon or carbonaceous feed stream without capture of carbon dioxide, e.g. by reforming natural gas), or "blue" hydrogen (i.e. hydrogen derived in the same way as "grey" hydrogen but where some or all of the carbon dioxide associated with production is captured), such as refineries, have similar tolerances for oxygen and water.

In some embodiments, the compressed hydrogen gas may be purified upstream of being fed to a downstream process.

For example, the residual oxygen gas in the compressed hydrogen gas may be converted into water by catalytic combustion of some of the hydrogen to produce oxygen-depleted compressed hydrogen gas (containing no more than 1 ppm $O_2$) which may then be dried to produce dry compressed hydrogen gas (containing no more than 1 ppm water) for use in a downstream process(es).

Compression

A method according to the present invention comprises a step of compressing the hydrogen gas in a multistage compression system to produce a compressed hydrogen gas. The multistage compression system is responsible for compressing hydrogen gas from the pressure at which the hydrogen gas is generated by electrolysis to an elevated pressure that is generally at least little higher than the feed pressure of any downstream process(es).

As explained in more detail below, at some point upstream of one or more, but preferably all, stages of compression, water and heat will be added, as required, to the hydrogen gas to humidify it. Therefore, in this section "hydrogen gas" may refer to hydrogen gas either before or after it has been humidified.

As will be readily appreciated, a "multistage" compression system has a plurality of stages of compression that may be split between compressors in parallel and/or in series. The overall pressure ratio across each stage is generally in the range of about 1.5 to about 2.5, e.g. about 2 to about 2.5 in order to limit the increase in temperature of the compressed gas.

Coolers are typically required between adjacent stages ("inter-coolers") and typically required after a final stage ("after-coolers") in multistage compression systems to remove heat of compression from compressed gas. Thus, in the context of the present invention, a "stage" of compression refers to the part of the compression system between coolers. In some embodiments described herein, direct contact coolers operate as the inter-coolers and/or after-coolers.

The multistage compression system comprises one or more compression sections. A "section" of compression in this context refers to the part of the compression system between feeds and products. Each section may comprise one or more stages of compression, together with the associated coolers.

In the present invention, the multistage compression system comprises at least one centrifugal compression stage. That is, the compressors used in one, some, or all stages are centrifugal compressors. The multistage compression system may comprise a plurality of centrifugal compression stage. Preferably, at least the first or initial stage of compression in the multistage compression system comprises a centrifugal compression stage.

It will be appreciated that in some embodiments the multistage compression system may have at least one centrifugal compression stage in combination with at least one reciprocal compression stage, i.e. a stage comprising reciprocating compressor(s).

It will be envisaged that in some preferred embodiments, all stages of the multistage compression system are centrifugal compression stages.

In the present invention, the hydrogen gas is fed to the centrifugal compression stage at a pre-determined feed temperature and pressure and having a pre-determined relative humidity.

As mentioned above, the feed temperature and pressure are pre-determined based on the design of the particular stage of compression. The feed temperature and pressure for that particular stage will in turn determine the "dew point" and the conditions at which the hydrogen gas will be considered to have a 100% relative humidity. As explained above, this is because the saturation vapour pressure of water is dependent upon the temperature, and the actual vapour pressure of water is dependent on pressure (and mole fraction of water). Thus, the higher the pressure, the lower the mole fraction of water required to reach 100% relative humidity for that pressure and vice versa (where temperature is kept constant). Similarly, the higher the temperature, the higher the mole fraction of water required to reach 100% relative humidity for that temperature and vice versa (where pressure is kept constant).

The mole fraction of water required to fully saturate the hydrogen gas being fed to the centrifugal compression stage to 100% relative humidity will therefore be dependent upon the pre-determined feed temperature and pressure for that particular stage.

In some embodiments herein, the pre-determined relative humidity for any given pre-determined feed temperature and pressure is about 50% up to 100%, about 70% up to 100%, about 80% up to 100%, preferably about 90% up to 100%, more preferably about 95% up to 100%.

In some embodiments, the predetermined feed temperature is from about 10 to about 80° C., preferably from about 20 to about 60° C., more preferably from about 30 to about 50° C.

In some embodiments herein, the pre-determined feed temperature may be the same for every stage of the multistage compression system.

In some embodiments, the pre-determined feed temperature is from about 20 to about 60° C. and the pre-determined relative humidity is from about 70 to 100%. In some preferred embodiments, the pre-determined feed temperature is from about 30 to about 50° C. and the pre-determined relative humidity is from about 80 to 100%.

In other embodiments herein, the pre-determined feed temperature is higher for each subsequent downstream stage of the multistage compression system, such as from about 5 to 30° C. higher than the preceding stage, preferably from about 5 to 15° C. higher than the preceding stage.

For example, in some embodiments the predetermined feed temperature is from about 20 to about 60° C. in the first stage of compression, and from about 30 to about 70° C. in the second stage of compression, and so on. In other more preferred embodiments herein, the pre-determined feed temperature is from about 30 to about 50° C. in the first stage of compression, and from about 40 to about 60° C. in the second stage of compression and so on.

In some other preferred embodiments, the pre-determined feed temperature is from about 5 to 15° C. higher for each subsequent downstream stage of the multistage compression system and the pre-determined relative humidity is from about 80 to 100%.

By allowing the pre-determined feed temperature to increase for each subsequent stage, this means less cooling is needed between the stages of compression (i.e. in the "intercoolers"). This in turn means that less water vapour is removed (condensed) from the compressed hydrogen gas during said cooling stages. The result of this is a higher apparent molecular weight of the hydrogen gas entering each subsequent stage compared with a hydrogen gas which had been cooled back to the same feed temperature as the preceding stage.

Preferably, the pre-determined relative humidity at the inlet to the compression stage is not more than 100%, as this will result in condensation of water vapour from the gas phase to produce liquid water within the hydrogen gas feed. The presence of liquid water is undesirable for a feed entering a compressor. Typically, a phase separator (or saturation column or direct contact cooler, as discussed below) may be present upstream of the centrifugal compressor to ensure that any liquid water is removed from the hydrogen gas feed entering the centrifugal compressor.

The compressed hydrogen gas produced by the multistage compression system typically has a pressure from about 10 bar to about 50 bar. In some embodiments, the pressure of the compressed hydrogen gas is from about 25 bar to about 35 bar, preferably about 30 bar. In other embodiments, the pressure of the compressed hydrogen gas is from about 10 bar to about 12 bar, preferably about 11 bar.

In some embodiments, the multistage compression system has only a single section to compress the hydrogen gas to the desired elevated pressure. In other embodiments, the multistage compression system comprises a first section and at least one further section downstream of the first section.

In particular embodiments, the multistage compression system has two sections, a first (low pressure or "LP") section in which hydrogen gas is compressed from the feed pressure to the multistage compression system to a first elevated pressure in the range from about 2 bar to about 6 bar, and a second (medium pressure or "MP") section in which hydrogen gas is compressed from the first elevated pressure to the final elevated pressure. The final elevated pressure may be that desired for any downstream process(es), for example.

In some embodiments, the first elevated pressure of the hydrogen gas after compression in the first section may be in the range of about 2 bar to about 3 bar, e.g. 2.5 bar. In other embodiments, the first elevated pressure may be in the range of about 4 bar to about 6 bar, e.g. 5 bar.

Adding Water and Heat

As explained above, there are various instances where the apparent molecular weight of the hydrogen gas being fed to the compression stage may drop below an optimal level, such as when dry hydrogen gas from storage is added to the feed or when a recycle system is used, for example.

To improve the performance of a centrifugal compression stage in which hydrogen gas is to be compressed, the present process involves adding water and heat to the hydrogen gas upstream of the centrifugal compression stage as required to humidify the hydrogen gas such that the hydrogen gas being fed to the centrifugal compression stage is at the pre-determined relative humidity (for the pre-determined feed temperature and pressure).

By maintaining the relative humidity of the hydrogen gas being fed to the centrifugal compression stage at the pre-determined level, the mole fraction of water in (and thus apparent molecular weight of) the gas feed entering the centrifugal compression stage is kept at a level suitable to provide optimal compressor performance.

Table 2 below contains the same data as Table 1 but includes calculations for the amounts of water which must be added in order to maintain the specified pressure ratio, by way of example only.

TABLE 2

| Centrifugal Hydrogen compression | | | | | |
|---|---|---|---|---|---|
| Stage | 1 | 2 | 3 | 4 | 4 |
| Normal feed, 30 bar discharge pressure | | | | | |
| Location | inlet | inlet | inlet | inlet | outlet |
| Stage pressure (bar) | 1.1 | 2.5 | 6 | 13.6 | 30 |
| Stage relative humidity | 100% | 100% | 100% | 100% | 100% |
| Stage temp (° C.) | 40 | 40 | 40 | 40 | 40 |
| Water mole fraction | 0.067 | 0.030 | 0.012 | 0.005 | 0.002 |
| Apparent molecular weight | 3.089 | 2.488 | 2.213 | 2.103 | 2.055 |
| Full recycle | | | | | |
| Stage inlet relative humidity | 44% | 42% | 44% | 45% | — |
| Stage inlet temp (° C.) | 40 | 40 | 40 | 40 | — |
| Water mole fraction | 0.030 | 0.012 | 0.005 | 0.002 | — |
| Apparent molecular weight | 2.488 | 2.213 | 2.103 | 2.055 | — |
| Head ratio | 0.806 | 0.889 | 0.950 | 0.977 | — |
| Ratio of pressure ratios (full recycle vs full flow) | 0.867 | 0.918 | 0.965 | 0.984 | — |
| Discharge pressure on recycle with same inlet pressure | 2.167 | 5.510 | 13.122 | 29.532 | — |

TABLE 2-continued

| Centrifugal Hydrogen compression | | | | | |
|---|---|---|---|---|---|
| Stage | 1 | 2 | 3 | 4 | 4 |
| Speed change needed to maintain pressure ratio | 1.114 | 1.060 | 1.026 | 1.011 | — |
| Water to add (full recycle) (kg/hr) | 14666 | 6349 | 2473 | 1057 | — |
| Total (kg/hr) | | | 24545 | | |
| Water to add (stage 1 recycle, dry feed to stage 2) (kg/hr) | 14666 | 10750 | 0 | 0 | |
| Total (kg/hr) | | | 25417 | | |

The amount of water to be added in order to restore 100% relative humidity of the feed for the particular pre-determined feed temperature and pressure can be calculated using methods known in the art.

For example, the molar flow of water is the total flow (e.g. $H_2+H_2O$) multiplied by the water mole fraction, so the difference between the water flow at 100% relative humidity and water flow at the actual humidity is what needs to be added. The table above does not show the hydrogen gas flow, but this can be back-calculated from the water flows. Note that the flows in the table are mass flows, so the molar flows would need converting to mass flows by multiplying by molecular weight.

In the present invention, hydrogen gas is fed to the centrifugal compression stage at a "pre-determined feed temperature". The present invention also involves adding heat to the hydrogen gas upstream of the centrifugal compression stage. At least part of this heat will be expended for evaporation of liquid water so as to increase the mole fraction of water in the hydrogen gas until it is fully saturated with water. Once fully saturated, any leftover heat will increase the temperature of the hydrogen gas, which in turn allows more water to be evaporated. Accordingly, one skilled in the art will readily appreciate that, in the present invention, the heat added to the hydrogen gas upstream of the stage should be such that the hydrogen gas being fed to the centrifugal compression stage is maintained at substantially the pre-determined feed temperature. In some embodiments, the hydrogen gas is humidified to the pre-determined relative humidity by measuring the mole fraction of water in the hydrogen gas upstream of the centrifugal compression stage, and injecting water into the hydrogen gas at a flowrate and/or temperature, wherein the flowrate and/or temperature of the water being injected is controlled as required based on the measured mole fraction of water. That is, if the measured mole fraction of water is such that the relative humidity of hydrogen gas being fed to the centrifugal compression stage is below the pre-determined relative humidity, the flowrate and/or temperature of the water being added may be increased until the pre-determined relative humidity is reached, and vice versa.

Alternatively, in some embodiments the hydrogen gas is humidified to the pre-determined relative humidity by measuring the relative humidity of the hydrogen gas being fed to centrifugal compression stage (at the pre-determined feed temperature and pressure), and injecting water into the hydrogen gas at a flowrate and/or temperature, wherein the flowrate and/or temperature of the water being injected is controlled as required based on the measured relative humidity. That is, if the measured relative humidity is below the pre-determined relative humidity, the flowrate and/or temperature of water being added may be increased until the pre-determined relative humidity is reached, and vice versa.

The relative humidity (at the pre-determined feed temperature and pressure) of the hydrogen gas being fed to the centrifugal compression stage can be determined using methods known in the art. One way in which the relative humidity of hydrogen gas could be determined is by measuring absolute humidity (the mass of water vapour present in unit volume of hydrogen gas) and then calculating relative humidity from a standard water saturation curve (e.g. steam tables). The absolute humidity can be measured using methods known in the art, such as by using an infrared spectrometer or a dewpoint meter, for example.

In some instances, measurement of the mole fraction of water in, or relative humidity of, hydrogen gas being fed to the centrifugal compression stage may not be needed if the pre-determined relative humidity is close to 100%, as this could be obtained by adding an excess of water to the hydrogen gas for humidification until excess liquid water is recovered in a downstream phase separator, thus indicating that a relative humidity of about 100% has been reached, for example. In this instance the temperature of the water should be high enough to allow water to evaporate, but not so high that the temperature of the hydrogen gas is increased far beyond the pre-determined feed temperature. In particular embodiments, the hydrogen gas is therefore humidified by adding an excess of water and controlling the temperature of the hydrogen gas to substantially the pre-determined feed temperature. Such a method provides fully water-saturated hydrogen gas (i.e. with a maximum mole fraction of water and relative humidity of 100%) without measurement.

The water may be injected into the hydrogen gas using any suitable means. In some embodiments, the hydrogen gas containing injected water may pass through a static mixer to homogenise the water and hydrogen gas and increase the heat and mass transfer between the phases.

The flowrate and/or temperature of the water being injected may be controlled depending on how much humidification of the hydrogen gas is required. A higher flowrate and/or a higher temperature will cause the mole fraction of water in the hydrogen gas to increase. Thus, for example, if the water mole fraction is such that the relative humidity of the hydrogen gas (when at the pre-determined feed conditions) is lower than the pre-determined relative humidity, the flowrate and/or temperature of the water may be increased to affect an increase in the water mole fraction of the hydrogen gas.

Two illustrative ways in which the conditions of the hydrogen gas can be manipulated, using flowrate or temperature of water being added, to ensure that the hydrogen gas being fed to the centrifugal compression stage is at the pre-determined relative humidity, will now be explained below.

For example, if the hydrogen gas, prior to being fed to the centrifugal compression stage, is at the correct pre-determined feed temperature, but with a relative humidity at that said temperature which is less than the pre-determined relative humidity, then it will have a water mole fraction below the required level. In this instance, the present process allows for the hydrogen gas to be humidified by increasing the flowrate and/or temperature of the water being added to increase the mole fraction of water (in such a way that the temperature of the hydrogen gas is not increased). This allows the hydrogen gas being fed to the centrifugal compression stage to have the pre-determined relative humidity when it is at the pre-determined feed conditions.

By way of a further example, if the hydrogen gas, prior to being fed to the centrifugal compression stage, is at a temperature lower than the pre-determined feed temperature, it may have a water mole fraction such that it is at 100% relative humidity for that said lower temperature. However, once the hydrogen gas is heated to the pre-determined feed temperature in preparation for feeding to the compression stage, the relative humidity at the pre-determined feed temperature will be below the required level. Therefore, in these instances the present process allows the hydrogen gas to be humidified by adding water of a higher temperature to increase the temperature of the hydrogen gas to the pre-determined feed temperature. This allows the hydrogen gas being fed to the compression stage, once it is at the pre-determined feed temperature, to have the correct pre-determined relative humidity.

Whether the temperature or the relative humidity (at the pre-determined feed temperature) are below the required levels as explained above, each can be addressed by controlling the flowrate and/or temperature of the water being added to the hydrogen gas upstream of the centrifugal compression stage.

The flowrate and temperature of the water being injected may be controlled using a control system, for example.

Thus, the process comprises adding water and heat to the hydrogen gas upstream of the centrifugal compression stage, as required, to humidify the hydrogen gas being fed to the centrifugal compression stage to the pre-determined relative humidity (at the pre-determined feed temperature and pressure for the stage).

In one example, the process may comprise simply adding water and heat until excess water no longer begins to vaporise, such that the further addition of water only increases the liquid water within the feed, thus indicating that a relative humidity of about 100% at the inlet conditions has been reached (although in this case the liquid water should be removed using a phase separator before entering the compressor). For example, the presence of excess liquid water in a downstream phase separator may be used to indicate that about 100% relative humidity at the inlet conditions has been reached.

Thus, in a particularly preferred embodiment where the pre-determined relative humidity is about 100%, the present process comprises adding an excess of water (and adding heat such that the hydrogen gas being fed to the centrifugal compression stage is at the pre-determined feed temperature). This results in a hydrogen gas feed to the centrifugal compression stage which is fully water-saturated at the pre-determined feed temperature (i.e. has a relative humidity of about 100%).

This works based on the principle that if there is an excess of water added to the hydrogen gas, the water will only evaporate in so far as it maintains the about 100% relative humidity (for the temperature of the hydrogen gas). In this example the temperature of the water should be such that there is only enough heat to evaporate the required amount of water, and not to overheat the hydrogen gas. If the hydrogen gas reaches 100% relative humidity (at the pre-determined feed temperature and pressure), any excess heat will increase the temperature and mole fraction of water whilst maintaining the 100% relative humidity. If there is not enough heat, the temperature will drop to maintain ~100% relative humidity. Thus, once the desired relative humidity at the inlet conditions reaches about 100%, the temperature of the water being added should be adjusted accordingly to prevent the hydrogen gas overheating. The temperature of the water is therefore adjusted to ensure the hydrogen gas, at the point at which it is fed to the compression stage, is at the pre-determined feed temperature.

By humidifying the hydrogen gas, the mole fraction of water and apparent molecular weight of the hydrogen gas increases.

The result is that the apparent molecular weight therefore will not drop to a level at which the performance of the centrifugal compressor is less than optimal, such as by providing a reduced discharge pressure. Thus, the present invention removes the need to resort to conventional methods of mitigating drops in pressure ratio of the centrifugal compressor. For example, conventional methods of increasing the pressure ratio typically include increasing the impeller speed during operation, which is limited by the maximum speeds of the impellers. Alternatively, another method is designing the multistage compression system with many more impellers in series. None of these methods are required once the present invention has been implemented.

As used herein, the expression "as required" means controlling the flowrate and temperature of water that is added to humidify the hydrogen gas such that the hydrogen gas being fed to the centrifugal compression stage is at the pre-determined relative humidity and feed temperature. In other words, heat and water will only be added when the humidity or temperature of the hydrogen gas is below a certain point. This maintains the relative humidity of the hydrogen gas being fed to the centrifugal compression stage at the pre-determined relative humidity (for the pre-determined feed temperature and pressure), which as explained above, allows centrifugal compressors receiving the gas to have improved performance.

The apparent molecular weight of the hydrogen gas may be measured or calculated using conventional methods. In some embodiments, water and heat are added such that the apparent molecular weight (in g/mol) of the hydrogen gas being fed to the centrifugal compression stage is from about 2.05 to about 7, e.g. from about 2.1 to about 4, or preferably from about 2.2 to about 3.5.

In some embodiments, water and heat are added to the hydrogen gas, as required, such that the apparent molecular weight (in g/mol) of the hydrogen gas being fed to the centrifugal compression stage has increased by an amount in a range from about 0.05 to about 5, e.g. from about 0.1 to about 2, or preferably from about 0.2 to about 1.5 (compared to hydrogen gas before humidification).

The water and heat may be added to the hydrogen gas, as required, upstream of any centrifugal compression stage in the multistage compression system. In some embodiments, the centrifugal compression stage is a first or initial stage in the multistage compression system.

In some embodiments, water and heat are added to the hydrogen gas as required upstream of every centrifugal compression stage in the multistage compression system, i.e. in embodiments where all of the stages in the multistage compression system are centrifugal compression stages, water and heat may be added to the hydrogen gas as required upstream of every stage (so added before the initial stage and between subsequent stages).

As mentioned above, recycle systems which circulate a portion of hydrogen gas from a cooler at the outlet end to the feed end of a compression stage may be included in centrifugal compressors. For example, recycle systems may be used to prevent compressor surge during periods where the source hydrogen gas mass flow is lower than is required.

In particular, where hydrogen gas is produced by electrolysis of water and the electricity generated for the electrolysis is from a renewable energy source, the flow of hydrogen gas from the electrolysers may be inherently variable. Thus, in these instances, recycle systems may also be used during normal operation to prevent surge as the flow is reduced below a minimum threshold.

Thus, in some embodiments, the centrifugal compression stage comprises an outlet end and a feed end, and the hydrogen gas being fed to the feed end contains recycled hydrogen gas taken from the outlet end after suitable pressure reduction. The "feed end" being the end of the compressor which receives hydrogen gas for (further) compression, and the "outlet end" being the end of the compressor which discharges compressed hydrogen gas.

As used herein, the term "suitable" in the context of pressure reduction is intended to mean that the pressure of the recycled hydrogen gas is reduced to an appropriate extent having regard to the inlet pressure (i.e. at the feed end) of the stage of the multistage compression system to which the recycled hydrogen gas is fed.

The flowrate and temperature of water that is added to the hydrogen gas may be determined based on the mole fraction of water of the hydrogen gas.

Thus, in some embodiments, the hydrogen gas is fed to the centrifugal compression stage at the pre-determined feed temperature by controlling temperature and/or flow rate of the water being added.

It will be appreciated that the temperature of the hydrogen gas may fluctuate within a margin of error of the pre-determined feed temperature, without departing from the scope of the present invention. For example, the temperature (and flowrate) of the water may maintain the temperature of the hydrogen gas being fed to the centrifugal compression stage within a margin of error about ±10° C., preferably about ±5° C., more preferably about ±2° C. of the pre-determined value.

Thus, the temperature to which the water is heated before being added to the hydrogen gas may depend on the pre-determined feed temperature. For example, if the pre-determined feed temperature is 40° C., then the water may be added at about 65° C. but with a much higher molar flow rate than the molar flow rate of the hydrogen gas, to humidify the hydrogen gas without increasing the temperature beyond the pre-determined feed temperature. Alternatively, if the pre-determined feed temperature is relatively high, such as 60° C., the water may be added at 85° C. but with an even higher molar flow rate to humidify the hydrogen gas.

The temperature and flow of the water being added is preferably selected so that there is just enough heat and flowrate to aid humidification without increasing the temperature of the hydrogen gas being fed to the compression stage far beyond the pre-determined feed temperature.

In some embodiments, the water is added at a temperature within about 60° C., within about 50° C., or preferably within about 30° C. of the pre-determined feed temperature.

In various embodiments, the water and heat are added, as required, as steam, de-superheated steam, liquid water, make-up water, reduced pressure recycle water, or combinations thereof.

In some embodiments, the water and heat are added as required directly to the hydrogen gas.

In further embodiments, the water and heat are added as required as liquid water to a saturation column having a top, a bottom and at least one heat and/or mass transfer zone located therebetween and wherein humidified hydrogen gas is removed from the top and fed to the centrifugal compression stage.

In yet still further embodiments, the water and heat are added as required as liquid water to a direct contact cooler having a top, a bottom and at least one heat and/or mass transfer zone located therebetween, and wherein humidified hydrogen gas is removed from the top of the direct contact cooler and fed to the centrifugal compression stage.

In various embodiments, the process comprises using a phase separator to remove excess liquid water from the hydrogen gas before it is fed to the centrifugal compression stage. By way of an example only, the phase separator may be a vessel whereby the two-phase mixture goes in through a nozzle, liquid falls to the bottom and goes through a liquid outlet nozzle and vapour rises to the top and leaves through a vapour outlet nozzle. The vessel would be designed with a low enough vapour velocity to ensure liquid droplets fall. There may also be a "mist eliminator", i.e. a device to knock out fine liquid drops that might be removed with the vapour. There may also be a baffle over the inlet to the phase separator to avoid liquid splashing, for example.

Steam Injection

One process for implementing the present invention includes adding the heat and water to the hydrogen gas in the form of steam. Thus, in some embodiments of the present invention, the water and heat are added as steam to form a combined steam/hydrogen stream.

By adding the water and heat, as required, in the form of steam, the mole fraction of water in the hydrogen gas is increased more directly. This is because less liquid water is needed and so substantially less evaporation of liquid water is needed to increase the level of water content in the gas phase. Additionally, by adding steam the cost may be reduced as no water pumps are involved.

Preferably, the steam when added is not so hot as to dramatically increase the temperature of the hydrogen gas in the combined stream. Thus, in some preferred embodiments, the steam is de-superheated steam.

De-superheating is the process by which superheated steam is reduced in temperature, either naturally or by design to be restored to the saturated steam temperature or slightly above. The de-superheated steam may be created due to heat loss in pipework, or deliberately induced with a desuperheater device.

A desuperheater device injects a controlled amount of water into the superheated steam to cool it. Thus, in some embodiments, liquid water is added to superheated steam to provide the de-superheated steam. The de-superheated steam may comprise a small fraction of liquid water, such as from about 1 to about 15%, preferably about 5 to about 10% of liquid water by weight.

The steam temperature is reduced by evaporative cooling of the water being injected into the superheated steam, thereby lowering the temperature. Most desuperheaters used to restore the saturated state produce discharge temperatures approaching saturation (typically to within 3° C. of the saturation temperature as a minimum).

In some embodiments, a valve is used to control the flow of the steam or de-superheated steam in order to maintain the temperature of the hydrogen gas being fed to the centrifugal compression stage at substantially the pre-determined feed temperature.

In some embodiments, the combined steam/hydrogen stream optionally passes through a static mixer, and then the combined steam/hydrogen stream optionally passes through a phase separator to remove liquid water from the hydrogen gas which is then fed to the centrifugal compression stage. In embodiments which use a static mixer, this allows the steam and hydrogen gas to be thoroughly homogenized to increase heat and mass transfer between the phases. By using a phase separator, liquid water is removed from the hydrogen gas being fed to the centrifugal compression stage.

In some embodiments, the removed liquid water is reused so that it at least forms part of the steam or de-superheated steam that is added to the hydrogen gas to form the combined steam/hydrogen stream. For example, the removed liquid water may be fed to a steam generation system which produces the steam or de-superheated steam. This allows for a process which uses less water and produces less wastewater overall, thus reducing cost to the user and the environment.

Water Injection

Another process for implementing the present invention includes injecting liquid water to add the water and heat to the hydrogen gas. Thus, in some embodiments, the water and heat are added as liquid water to produce a two-phase combined stream.

Preferably, in some embodiments the two-phase stream passes through a static mixer prior to being fed to a phase separator to remove excess liquid water from the hydrogen gas which is then fed to the centrifugal compression stage.

By using a static mixer, the gas and liquid phases are thoroughly mixed, increasing contact between the two phases in the stream to ensure more efficient heat/mass transfer. A phase separator is a device which separates liquid phase materials and gaseous phase materials from a combined stream. In the present invention, phase separators may be used to ensure liquids are removed from a stream before it is fed to a centrifugal compressor.

In some embodiments, the liquid water is added to the hydrogen gas and then excess liquid water (after humidification) is removed using the phase separator. The removed excess liquid water may be disposed of, but it is preferable that it is at least partly reused as part of the liquid water being added to the hydrogen gas to form the two-phase combined stream for humidification. This reduces the amount of water required to implement the invention, and also reduces the amount of wastewater produced by the overall process.

Thus, in some embodiments, the process of the present invention comprises using the liquid water from the phase separator as at least part of the liquid water being added to the hydrogen gas to form the two-phase combined stream. In these embodiments, the temperature and/or flowrate of the liquid water from the phase separator that is reused is controlled such that the temperature of the hydrogen gas being fed to the centrifugal compression stage is substantially at the pre-determined feed temperature.

Preferably, the temperature and/or flowrate of the liquid water being added to form the two-phase combined stream is controlled so as to humidify the hydrogen gas to the pre-determined relative humidity at the pre-determined feed temperature. In other words, so that the hydrogen gas being fed to the centrifugal compression stage is at the pre-determined relative humidity at the pre-determined feed conditions.

In some embodiments, the process comprises determining the mole fraction of water in the hydrogen gas upstream of the centrifugal compression stage, and adding the liquid water at a flowrate and temperature, wherein the flowrate and temperature of the liquid water is controlled, as required, based on the determined mole fraction of water.

In other embodiments, the process comprises determining the relative humidity in the hydrogen gas being fed to the centrifugal compression stage, and adding the liquid water at a flowrate and temperature, wherein the flowrate and temperature of the liquid water is controlled as required based on the determined relative humidity.

In preferred embodiments, the pre-determined relative humidity is about 100% and the hydrogen gas is humidified by adding an excess of water and controlling the temperature of the hydrogen gas to substantially the pre-determined feed temperature.

Saturation Column

Alternatively, rather than adding liquid water to the hydrogen gas to form a two-phase combined stream, the process may comprise using a saturation column for humidifying the hydrogen gas.

Thus, in some embodiments the process comprises humidifying the hydrogen gas with liquid water in a saturation column having a top, a bottom and at least one heat and/or mass transfer zone located therebetween.

The "saturation column" serves to increase the surface area upon which the gas and liquid phases in the hydrogen gas stream can be contacted. This increases the efficiency of the heat and/or mass transfer between the gas and liquid phases to further aid humidification.

The heat and/or mass transfer zone may use structured packing or random packing of heat and/or mass transfer elements. The heat and/or mass transfer zone preferably comprises heat and/or mass transfer elements, including but not limited to, corrugated sheets packed in blocks (made of plastic or metals such as aluminium), or gauze plates with packed rings or pebbles therebetween, or distillation trays, for example.

In such embodiments, the process also comprises removing humidified hydrogen gas from the top of the saturation column and feeding the humidified hydrogen gas to the centrifugal compression stage. It also comprises removing excess liquid water from the bottom of the saturation column. Thus, in these embodiments, the saturation column acts also as a phase separator (and no additional phase separator is located upstream of the centrifugal compression stage). Preferably, the liquid water for humidification is added near or at the top of the saturation column to maximise the length of the column where the gas and liquid phases are in contact.

The removed excess liquid water may be disposed of, but it is preferable that it is at least partly reused as part of the liquid water being added to the hydrogen gas in the saturation column for humidification. This reduces the amount of water required to implement the invention, and also reduces the amount of wastewater produced by the overall process.

Thus, in some embodiments, the process of the present invention comprises using the excess liquid water removed from the bottom of the saturation column as at least part of the liquid water being used to humidify the hydrogen gas in the saturation column. Preferably, the temperature and/or flowrate of the excess liquid water removed from the bottom of the saturation column that is reused is controlled such that the temperature of the hydrogen gas being fed to the centrifugal compression stage is substantially at the pre-determined feed temperature.

Preferably, the temperature and/or flowrate of the liquid water being added for humidification to the saturation column is controlled so as to humidify the hydrogen gas to the pre-determined relative humidity at the pre-determined feed temperature. In other words, so that the hydrogen gas being fed to the centrifugal compression stage is at the pre-determined relative humidity at the pre-determined feed conditions.

In some embodiments, the process comprises determining the mole fraction of water in the hydrogen gas upstream of the centrifugal compression stage, and adding the liquid water to the saturation column at a flowrate and temperature, wherein the flowrate and temperature of the liquid water is controlled, as required, based on the mole fraction of water.

In other embodiments, the process comprises determining the relative humidity in the hydrogen gas being fed to the centrifugal compression stage, and adding the liquid water to the saturation column at a flowrate and temperature, wherein the flowrate and temperature of the liquid water is controlled, as required, based on the determined relative humidity.

In preferred embodiments, the pre-determined relative humidity is about 100% and the hydrogen gas is humidified by adding an excess of water to the saturation column and controlling the temperature of the hydrogen gas to substantially the pre-determined feed temperature.

Water Recycle Step

Whether liquid water is added to form a two-phase combined stream or a saturation column is used for humidification, the excess liquid water that has been removed will be cooler than the compressed hydrogen gas, and so in some embodiments the excess liquid water may also be used to cool the compressed hydrogen gas.

Thus, in some embodiments, the process of the present invention comprises pumping the liquid water from the phase separator or saturation column to produce pumped liquid water, and further comprises cooling compressed hydrogen gas by indirect heat exchange against the pumped liquid water in a cooler to produce cooled compressed hydrogen gas and warmed liquid water. Since less additional cooling is needed, this results in a process which uses less energy and so is more energy efficient overall.

The pumping of the excess liquid water may be carried out using any suitable water pump, including but not limited to a centrifugal pump. Preferably, the excess liquid water is pumped to a pressure that is just enough to overcome any pressure drops in the system (due to friction and/or due to static pressure from level changes).

The pumped liquid water is then fed to a cooler where indirect heat exchange may occur between the hot compressed hydrogen gas and the pumped liquid water. This cooler may be a hydrogen cooler or water heater, or a heat exchanger. Thus, there is no direct contact between the pumped liquid water and the compressed hydrogen gas, which are instead each in contact with a heat-conducting material that transfers heat energy efficiently between the water and gas. For example, the cooler may be a shell-and-tube type cooler wherein the water is in the "tube" and the gas is passed through the "shell". The tubes may typically have fins on the gas side (discs around each tube at short intervals to increase the heat transfer area). The transfer of heat will be from the compressed hydrogen gas to the pumped water.

This heats up the pumped liquid water to provide warmed liquid water, which is suitable for reuse as part of the liquid water added in the humidification step of the process. This also at least partly cools the compressed hydrogen gas towards a pre-determined feed temperature for a subsequent stage (or possibly a downstream process if it is the final stage). In some embodiments, an additional cooler may also be used to further cool the compressed hydrogen gas to a second pre-determined feed temperature for a subsequent stage (or possibly a downstream process if it is the final stage). The additional cooling may be provided by a cooling water stream, for example.

In some embodiments, the cooler for indirect heat exchange and additional cooler are part of a single cooling unit, i.e. they may be provided as part of a shell-and-tube type cooling unit whereby two separate bundles of "tubes" are included, one with the pumped excess liquid water and one with the additional cooling water.

In some embodiments, the cooler for indirect heat exchange or the additional cooler (or both if they are a single unit) also operate as a phase separator which removes excess liquid water. In such embodiments, this provides a simpler arrangement and may remove any need for a separate phase separator.

In embodiments where liquid water is added to the hydrogen gas to form a two-phase combined stream, the excess liquid water removed from the phase separator will be at substantially the same temperature as the hydrogen gas being fed to the centrifugal compression stage (i.e. the pre-determined feed temperature).

In embodiments where the hydrogen gas is humidified in a saturation column, the excess liquid water removed from the bottom of the saturation column will be at a temperature lower than the hydrogen gas being fed to the centrifugal compression stage (i.e. the pre-determined feed temperature). This is because of the heat and mass transfer which takes place in the saturation column, i.e. due to the loss of heat and mass from the water stream due to water evaporation. Thus, in such embodiments, the cooler for indirect heat exchange requires less heat transfer area because of the increased temperature difference between the pumped liquid water and compressed hydrogen gas, and thus costs less.

The pumped liquid water, once heated by the indirect heat exchange cooler, will be preferably reduced in pressure to produce reduced pressure recycle water. The pressure may be reduced only insofar as is required to control the flow of water. This reduced pressure recycle water is then used as at least part of the liquid water being added to the hydrogen gas for humidification.

In some embodiments, the process comprises adding make-up water to the hydrogen gas or reduced pressure recycle water, as required. That is, make-up water is only added to "top up" the total amount of water to be added to the hydrogen gas so that it is sufficiently humidified. In some preferred embodiments, at least part of the make-up water is sourced from another part of the multistage compression system which dispenses excess liquid water, e.g. from a phase separator, saturation column, or direct contact cooler.

In embodiments where a two-phase combined stream is produced and fed to a phase separator, at least part of, but preferably all of the reduced pressure recycle water may be added to the hydrogen gas upstream of the phase separator. Alternatively, it may be added via spraying directly into the phase separator.

In embodiments where a saturation column is used, at least part of, but preferably all of the reduced pressure recycle water may be used as at least part of the liquid water being used to humidify the hydrogen gas in the saturation column.

The make-up water may be added to the reduced pressure recycle water, or alternatively added to the phase separator or saturation column directly.

The flowrate of the reduced pressure recycle water (and if used, the make-up water) being added to the hydrogen gas is controlled such that there is sufficient water added to the hydrogen gas for humidification. The flowrate of the reduced pressure recycle water, in some embodiments, may be controlled so as to help maintain the temperature of the hydrogen gas being fed to the centrifugal compression stage at about the pre-determined feed temperature. That is, the amount by which the flowrate is adjusted may be dependent on the temperature of the hydrogen gas being fed to the stage, and the pre-determined feed temperature. This is so that the temperature of the hydrogen gas being fed to the centrifugal compression stage does not substantially deviate from the pre-determined feed temperature.

In a preferred embodiment, the water and heat are added by fully recycling the reduced pressure recycle water and controlling the temperature of the reduced pressure recycle water. Then additional water is added by controlling the flowrate of the make-up water, as required, to provide the total amount of water required for humidification of the hydrogen gas. In this embodiment, the make-up water is added at substantially the pre-determined feed temperature. In other words, the make-up water is only intended to "top-up" water which is lost, not to add any of the required heat.

In some embodiments, the temperature of the reduced pressure recycle water (and optionally, the make-up water if used) is also controlled, as well as the flowrate, by using an external heater. This ensures that there is enough heat added to allow the added liquid water to evaporate to sufficiently humidify the hydrogen gas.

In some embodiments, the temperature of the reduced pressure recycle water may be controlled by allowing it to bypass the indirect heat exchange cooler, so that the recycle water is heated less (or not at all) by the compressed hydrogen gas. This may be the case, for example, when less or no heat needs to be added to the hydrogen gas because its mole fraction of water is such that the hydrogen gas being fed to the centrifugal compression stage is already at the pre-determined relative humidity. Such embodiments would also involve using an additional cooler to cool the compressed hydrogen gas.

In some embodiments, at least part of the excess liquid water removed from the bottom of the phase separator or saturation column is used as at least part of the make-up water.

It will be appreciated that since the above steps can be applied to any stage of centrifugal compression, the term "cooler" as it is used in this context could refer to a step of cooling after any particular stage, whether it be an intermediate ("inter-cooler") or final stage of compression ("after-cooler").

Direct Contact Coolers

As mentioned above, multistage compression systems may include recycle systems that circulate a portion of hydrogen gas from a cooler at the outlet end of the compression stage and pass it to the feed end of the compression stage. For example, recycle systems may be used to prevent compressor surge during periods where the source hydrogen gas mass flow is lower than is required for feeding to the compressor.

The compressed hydrogen gas at the outlet end is at a higher temperature and pressure than the hydrogen gas at the inlet end. Once it is cooled in the cooler and the temperature is reduced, the saturation vapour pressure of water also decreases. The result of this is that in order to preserve the relative humidity for the reduced temperature at about 100%, water vapour condenses out of the compressed hydrogen gas as it is being cooled. This loss of water vapour results in a decreased mole fraction of water and apparent molecular weight of the cooled compressed hydrogen gas.

When the recycle system takes part of this cooled compressed hydrogen gas for recycling and reduces its pressure to match the pre-determined feed conditions for the compression stage, the mole fraction of water will be reduced compared with the wet non-recycled hydrogen gas (see Table 1 above which demonstrates this effect).

Therefore, during situations where hydrogen gas is being recycled in this way, the recycled hydrogen gas has a reduced apparent molecular weight that, once added to the wet hydrogen gas, will reduce the overall apparent molecular weight of the hydrogen gas being fed to the compression stage. Accordingly, the recycling of hydrogen gas in this way will be detrimental to the performance of the centrifugal compressor.

The present inventors have found a method for using a recycle stream whereby recycled hydrogen is removed upstream of any cooling step (so before any condensation of water vapour occurs) to address this issue of reduced apparent molecular weight when recycling.

However, although this arrangement precludes recycling of hydrogen gas with a lower apparent molecular weight, without any cooling step the recycled hydrogen gas will be hot and so will adversely increase the temperature of the hydrogen gas being fed to the centrifugal compression stage, i.e. beyond the pre-determined feed temperature.

To address this issue, the present inventors have found that by feeding the hydrogen gas through direct contact coolers upstream of the centrifugal compression stage, the rise in temperature can be reversed whilst also providing a means for humidifying the hydrogen gas.

Thus, another process for implementing the present invention involves using a first direct contact cooler. In such a process, water is added as liquid water.

In such embodiments, the process comprises humidifying the hydrogen gas with liquid water in a first direct contact cooler having a top, a bottom and at least one heat and/or mass transfer zone located therebetween. The process also comprises removing humidified hydrogen gas from the top of the first direct contact cooler and feeding the humidified hydrogen gas to the centrifugal compression stage (for compression to produce compressed hydrogen gas) and removing excess liquid water from the bottom of the first direct contact cooler. Preferably, the liquid water for humidifying the hydrogen gas is added to the top of the direct contact cooler, to maximise the length of the column in which the liquid and gas phases are in contact.

A "direct contact cooler" may be composed substantially of the same materials and parts as a saturation column. Thus, the heat and/or mass transfer zone may comprise the same elements discussed above in relation to the saturation column and these are not repeated for brevity. The differences between direct contact coolers and saturation columns lie only in the way they operate. Under certain conditions, a direct contact cooler as described herein will operate in the same way as a saturation column.

In these embodiments, the process also comprises recycling, as required, a portion of the compressed hydrogen gas produced in the centrifugal compression stage to the first direct contact cooler, after suitable pressure reduction, and without any cooling.

Thus, in other words the compressed hydrogen gas from the centrifugal compression stage is divided into a recycle stream and a feed stream, wherein the recycle stream is reduced in pressure and re-fed to the first direct contact cooler; and the feed stream is fed to a downstream stage or process.

The recycled portion of hydrogen gas (from the recycle stream) has not been cooled before it is fed to the first direct contact cooler, and so when hydrogen gas is being recycled, the temperature of the combined hydrogen gas being fed to the first direct contact cooler will increase depending on the amount of recycled hydrogen gas added. Since the recycled hydrogen gas has not been cooled, a particular advantage of this is that it has not had any water removed from it. That is, there is no loss of apparent molecular weight in the combined hydrogen gas being added to the first direct contact cooler, due the addition of recycled hydrogen gas.

A corresponding application directed to the recycling of wet hydrogen gas has been filed on the same day as the present application by the same Applicant with the title "A PROCESS AND APPARATUS FOR COMPRESSING HYDROGEN GAS IN A CENTRIFUGAL COMPRESSOR" with the internal reference number "08231A U.S.A." and the U.S. Patent Application No. [to be advised]. This application is hereby incorporated herein by reference in its entirety.

Direct contact coolers can effectively be used in two ways:
  i. as a saturation column to maintain the mole fraction of water in the hydrogen gas, particularly when the hydrogen gas source has low mole fraction of water (such as when the hydrogen gas contains dry hydrogen gas from storage), and/or
  ii. as a cooler to cool hydrogen gas so that the temperature of the hydrogen gas being fed to the centrifugal compression stage is maintained at substantially the pre-determined feed temperature, particularly when the hydrogen gas is at a high temperature (such as when it contains hot recycled hydrogen gas).

Thus, a particular advantage of a process that uses one or more direct contact coolers is that no separate saturation columns or coolers are required, thus lowering the overall cost and simplifying apparatus design.

In some embodiments, the temperature and/or flowrate of the liquid water in the first direct contact cooler is controlled such that the temperature and relative humidity of the hydrogen gas being fed to the centrifugal compression stage is maintained at substantially the pre-determined feed temperature and pre-determined relative humidity. In these embodiments, the pre-determined feed temperature and pre-determined relative humidity are preferably in the ranges already discussed above. But in some particularly preferred embodiments, the pre-determined feed temperature is from about 30 to about 50° C. and the pre-determined relative humidity (at the inlet conditions) is from about 80 to 100%.

For example, if the hydrogen gas being fed to the direct contact cooler has a temperature or mole fraction of water which is too low (such that the hydrogen gas being fed to the centrifugal compression stage has a temperature and/or relative humidity below the pre-determined levels), the temperature and/or flowrate of the liquid water in the first direct contact cooler may be increased, as required, such that the temperature and relative humidity of the hydrogen gas being fed to the centrifugal compression stage matches the pre-determined feed temperature and relative humidity.

Some examples will now be described below to demonstrate how, in different situations, the conditions of the liquid water in the first direct contact cooler could be manipulated to humidify or heat/cool the hydrogen gas as required.

If the hydrogen gas being fed to the first direct contact cooler is saturated with a mole fraction of water which is sufficient (such that if it were measured at the pre-determined inlet conditions it would have the pre-determined relative humidity), but has a temperature higher than the pre-determined feed temperature (such as due to the addition of hot recycled hydrogen gas), then no humidification is required, only cooling. In this instance, the temperature and flowrate of the liquid water in the first direct contact cooler can be adjusted accordingly to maintain the temperature of the hydrogen gas being fed to the centrifugal compression stage at substantially the pre-determined feed temperature. Once the hydrogen gas has been cooled to substantially the pre-determined feed temperature, the correct mole fraction of water results in the correct pre-determined relative humidity.

If the hydrogen gas being fed to the first direct contact cooler has a mole fraction of water which is too low (e.g. too dry) and also has a temperature higher than the pre-determined feed temperature, then the hydrogen gas already has the heat required for humidification, but requires cooling. In this instance, the temperature of the liquid water is low enough such that it cools the hydrogen gas to the pre-determined feed temperature but at the same time takes advantage of the heat in the hydrogen gas to evaporate water and humidify the hydrogen gas.

If the hydrogen gas being fed to the first direct contact cooler has a mole fraction of water which is too low (e.g. too dry) and also has a temperature lower than the pre-determined feed temperature, then the hydrogen gas requires the heat for humidification to be added. In this instance, the temperature of the liquid water is high enough such that it evaporates liquid water to humidify the hydrogen gas and increase the mole fraction of water, but at the same time low enough to cool the hydrogen gas to substantially the pre-determined feed temperature.

In embodiments where the centrifugal compression stage is not an initial stage of the multistage compression system, the hydrogen gas being fed to the first direct contact cooler will have been compressed in an upstream stage, and therefore will be at a temperature above the pre-determined feed temperature. In this instance, the temperature of the liquid water is low enough such that it cools the hydrogen gas to the pre-determined feed temperature. If the hydrogen gas also has a mole fraction of water which is too low, the temperature of the liquid water can be selected such that at least a part of this heat is used for humidification of the hydrogen gas.

The temperature of the liquid water in the first direct contact cooler may be adjusted by mixing it with a portion of removed excess liquid water which has been recycled from elsewhere in the apparatus for carrying out the invention. Alternatively, the temperature of the liquid water may be adjusted by an external cooler or heater as required.

It will be appreciated that the temperature of the hydrogen gas being fed to the centrifugal compression stage will be maintained within a reasonable margin of error, typically within about ±10° C., preferably about ±5° C., more preferably about ±2° C. of the pre-determined feed temperature.

As mentioned above, the process may comprise dividing compressed hydrogen gas from the centrifugal compression stage into a recycle stream and a feed stream for a downstream stage.

A second direct contact cooler may be used in some embodiments. In these instances, the centrifugal compression stage is an initial or an intermediate stage of the multistage compression system, and the compressed hydrogen gas from the centrifugal compression stage (in the feed stream) is fed to the second direct contact cooler.

In such embodiments, the process comprises humidifying the compressed hydrogen gas with liquid water in a second direct contact cooler having a top, a bottom and at least one heat and/or mass transfer zone located therebetween. The process also comprises removing humidified hydrogen gas from the top of the second direct contact cooler and feeding the humidified hydrogen gas to a further centrifugal compression stage and removing excess liquid water from the bottom of the second direct contact cooler.

The second direct contact cooler operates in substantially the same way as the first direct contact cooler described above. However, since the hydrogen gas being fed to the second direct contact cooler has been compressed, it is at a temperature above the pre-determined feed temperature for the further centrifugal compression stage, and so requires cooling in the second direct contact cooler.

The temperature and flowrate of the liquid water for humidification in the second direct contact cooler will be determined based on the temperature and mole fraction of water in the hydrogen gas being fed to the second direct contact cooler, or alternatively the temperature and relative humidity of the hydrogen gas being fed to the further centrifugal compression stage. The temperature and/or flowrate of the water being fed to the second direct contact cooler will also be determined based on the pre-determined feed temperature and pre-determined relative humidity for the further centrifugal compression stage.

In some embodiments, the liquid water streams for the first direct contact cooler and the second direct contact cooler are obtained from the same liquid water stream which is split into two parts before being fed to the respective direct contact coolers.

In some embodiments, the temperature and/or flowrate of the liquid water being added to the first and second direct contact coolers is controlled for each direct contact cooler separately, and adjusted depending on the temperature and/or mole fraction of water in the hydrogen gas being fed to the centrifugal compression stage and further centrifugal compression stage respectively.

The temperature and/or flowrate of the water being added to each direct contact cooler may be controlled by a suitable control system, for example. Such a control system may determine whether and by how much the temperature or water mole fraction of the hydrogen gas deviates from the desired values and adjust the temperature and/or flow of the liquid water accordingly.

In some embodiments, the excess liquid water removed from the bottom of the first and second direct contact cooler is collected and combined to be returned, optionally heated or cooled (as required), and reused as at least part of the liquid water for humidification in the first and/or second direct contact coolers.

In some embodiments, hydrogen gas from storage is added to the feed stream to the second direct contact cooler as required. Hydrogen gas from storage is typically purified, and thus has a very low (or entirely absent) mole fraction of water. Preferably, in such embodiments the temperature and/or flowrate of the liquid water for the second direct contact cooler is controlled based on the amount of hydrogen gas added from storage, or alternatively, the mole fraction of water in the combined hydrogen gas being fed to the second direct contact cooler. This ensures that the mole fraction of water in the hydrogen gas being fed to the further compression stage is such that it is sufficiently humidified to provide the pre-determined relative humidity at the further compression stage inlet conditions.

In some embodiments, the process comprises recycling, as required, a portion of the further compressed hydrogen gas produced in the further centrifugal compression stage to the hydrogen gas feed to the second direct contact cooler after suitable pressure reduction and without any cooling.

Thus, in other words reduced pressure hydrogen gas recycled from the further centrifugal compression stage is added to the feed stream to the second direct contact cooler, as required. Where this reduced pressure hydrogen is recycled before any cooling step, it will be hot and so result in an increase of the temperature of the hydrogen gas in the feed stream. Thus, the temperature and/or flowrate of the liquid water for the second direct contact cooler may be controlled based on the amount of reduced pressure hydrogen gas recycled and added to the feed stream to the second direct contact cooler, or alternatively, the measured temperature of the combined hydrogen gas being fed to the second direct contact cooler. This ensures that the temperature of the hydrogen gas being fed to the further compression stage is maintained to substantially the pre-determined feed temperature for the further compression stage, but in any case within a reasonable margin of error, typically within about ±10° C., preferably to within about ±5° C., more preferably about ±2° C. of the pre-determined feed temperature.

Hydrogen Gas Storage

Depending on the type of electricity generated for the electrolysis, the present invention may include the use of hydrogen storage in the method.

European Patent Application No. 20188259.4 in the same name as the present Applicant describes a method of storing hydrogen gas for use in a multistage compression system and this document is incorporated herein by reference in its entirety.

In some embodiments where the electricity generated for the electrolysis may be from a renewable energy source, the availability of the energy source will inherently fluctuate. This results in less hydrogen gas being produced by the electrolysis. One way in which this problem may be addressed is by providing a system for collecting and storing at least some, preferably all, of the excess hydrogen gas produced during periods when production exceeds demand from a downstream process(es), and distributing stored hydrogen gas to the downstream process(es) during periods when the demand exceeds production.

In some embodiments, the compressed hydrogen may be stored without further compression. In these embodiments, the gas is stored at a pressure up to a maximum pressure of the pressure to which the hydrogen is compressed in the multistage compression system, e.g. a pressure up to a maximum of about the feed pressure of a downstream process (where there is only one) or about the feed of one of the downstream processes (if there are more than one). In such embodiments, the compressed hydrogen may perhaps be stored at a pressure up to a maximum pressure in the region of about 25 bar to about 30 bar.

The compressed hydrogen may however be further compressed prior to storage. In these embodiments, compressed hydrogen gas may be stored at a pressure up to a maximum of about 200 bar, or up to a maximum of about 150 bar, or up to a maximum of about 100 bar, or up to a maximum of about 90 bar, or up to a maximum of about 80 bar, or up to a maximum of about 70 bar, or up to a maximum of about 60 bar, or up to a maximum of about 50 bar.

During periods when the level of demand for hydrogen exceeds the production level, compressed hydrogen gas is removed from storage and reduced in pressure to produce reduced pressure hydrogen gas. Pressure may be reduced in any conventional manner, particularly by passing the gas through a valve.

The pressure of the reduced pressure hydrogen gas will depend on the pressure at the point in the multistage compression system to which the reduced pressure hydrogen gas is to be added.

In some embodiments, reduced pressure hydrogen gas may be fed to the final stage of the multistage compression system. In these embodiments, the reduced pressure hydrogen gas will be at the inlet pressure of the feed to the final stage.

In other embodiments, reduced pressure hydrogen gas may be fed to an intermediate stage of the multistage compression system. In these embodiments, the reduced pressure hydrogen gas will be at the inlet pressure of the feed to the intermediate stage.

The intermediate stage may be an intermediate stage within a compression section or, where there are two or more sections in the multistage compression system, the initial stage within a further compression section downstream of a first compression section. In these embodiments, the reduced pressure hydrogen gas will be at the inlet pressure of the feed to the further section, i.e. the "inter-section" pressure.

In still further embodiments, the reduced pressure hydrogen gas may be fed to the feed end, i.e. to the initial stage, of the multistage compression system. In these embodiments, the reduced pressure hydrogen gas will be the feed pressure to the multistage compression system, e.g. about 1.1 bar.

During periods when demand exceeds production, the method may comprise:
  reducing the pressure of the compressed hydrogen gas withdrawn from storage to produce reduced pressure hydrogen gas at the inlet pressure to a first stage of the multistage compression system (a first intermediate pressure); and
  feeding the reduced pressure hydrogen gas to the first stage.

In such embodiments, once the pressure of the compressed hydrogen gas in storage falls to about the inlet pressure of the first stage, the method may comprise:
  reducing further the pressure of the compressed hydrogen gas withdrawn from storage to produce reduced pressure hydrogen gas at an inlet pressure to a second stage of the multistage compression system upstream of the first stage (a second intermediate pressure); and
  feeding the reduced pressure hydrogen gas to the second stage.

It will be understood that the terms "first stage" and "second stage" in this context do not refer to the relative positions of the stages in the multistage compression system in the downstream direction during normal operation. In contrast, the terms are merely intended to reflect the order of the stages to which reduced pressure hydrogen gas is fed to the multistage compression system during periods when demand exceeds production. The terms "first intermediate pressure" and "second intermediate pressure" should be interpreted accordingly with the first intermediate pressure being higher than the second intermediate pressure.

These embodiments may further comprise feeding reduced pressure hydrogen gas to other stages of the multistage compression system upstream of the first and second stages. In these further embodiments, the pressure of the compressed hydrogen gas withdrawn from storage is reduced to the inlet pressure to the respective stages.

In some preferred embodiments, the second stage is the initial stage of the multistage compression system.

It will be appreciated that, in embodiments where reduced pressure hydrogen gas is fed to a second stage after the first stage, gas flow to the first stage is stopped when gas flow to the second stage starts. Generally speaking, flow of reduced pressure hydrogen gas to a given compression stage is stopped when flow of reduced pressure hydrogen gas to another compression stage starts.

Since hydrogen gas can be returned from storage to an intermediate stage and/or the initial stage of the multistage compression system, the compressed hydrogen gas may be stored at a pressure down to a minimum of about 5 bar, perhaps even down to a minimum of about 1.3 bar.

In embodiments in which compressed hydrogen gas is further compressed before being stored, another option would be for compressed hydrogen gas withdrawn from storage to be fed, after suitable pressure reduction, directly to the downstream process(es) until the storage pressure falls to the feed pressure of the downstream processes. At that point, the pressure of the compressed hydrogen gas withdrawn from storage would be reduced further and the reduced pressure hydrogen gas fed to a stage of the multistage compression system in accordance with the present invention. However, these embodiments are not preferred, e.g. because of the additional capital expense of the high-pressure storage system.

Compared to a high-pressure hydrogen storage system with discharge only to the feed pressure of a downstream process, this enables the storage volume of hydrogen to be reduced by using the multistage compression system that is already present in the process to recompress hydrogen from storage when the storage pressure drops below that feed pressure. The hydrogen can thereby continue to be taken from storage until the storage pressure falls to a minimum of the feed pressure to the multistage compression system.

Additional compression power is required during periods when hydrogen production is limited by lack of power to the electrolysers, but the additional compression power can be minimised by supplying hydrogen at the highest compressor inter-stage pressure possible given the storage pressure at a particular time. It also allows the maximum hydrogen storage pressure to be at or below the feed pressure of the downstream process to eliminate any additional compression requirement for hydrogen to storage.

It will be appreciated that the same volume of gas is stored in the same storage volume at the same maximum pressure and that reducing the minimum storage pressure increases the "releasable" volume of gas from storage, i.e. the usable volume of stored gas.

Where hydrogen is produced and then compressed in a multistage compression system for use in at least one downstream process, the releasable volume of stored hydrogen may be increased by returning hydrogen from storage to a stage in the multistage compression system rather than directly to the downstream process—this arrangement reduces the overall storage vessel volume required by the process.

By way of example, storage from a maximum pressure of 200 bar to a minimum pressure of 1.5 bar requires 15% less storage vessel volume for a given mass of releasable hydrogen compared to storage from a maximum pressure of 200 bar to a minimum pressure of 30 bar.

Similarly, storage from a maximum pressure of 100 bar to a minimum pressure of 1.5 bar requires 30% less storage vessel volume for a given mass of releasable hydrogen compared to storage from a maximum pressure of 100 bar to a minimum pressure of 30 bar.

In addition, storage from a maximum pressure of 50 bar to a minimum pressure of 1.5 bar requires 60% less storage vessel volume for a given mass of releasable hydrogen compared to storage from a maximum pressure of 50 bar to a minimum pressure of 30 bar.

Further, storage from a maximum pressure of 30 bar to a minimum pressure of 1.5 bar is feasible compared to 30 bar to 30 bar which would allow no storage.

Moreover, although the total storage vessel volume increases as the maximum storage pressure is reduced, the lower design pressure makes the vessel walls thinner and can reduce the overall capital cost of the storage system. The vessel thickness is often limited to a maximum value by considerations such as manufacturability, and in that case the lower design pressure will lead to fewer vessels (although each vessel will be larger). Furthermore, the allowable stress for the design of a vessel may be increased below a particular vessel wall thickness, and if the lower design pressure allows the thickness to be below this threshold, the total vessel metal mass (and therefore the total cost) can be reduced.

Downstream Process(es)

In some embodiments, the compressed hydrogen gas, once compressed, may be consumed in a downstream process, or in more than one downstream process arranged in parallel.

The downstream process(es) could include any process that would currently use "grey" hydrogen or "blue" hydrogen. Such processes include oil refining and steel manufacture.

By way of an example, at least some, e.g. all, of the compressed hydrogen could be used to produce ammonia via the Haber (or Haber-Bosch) process. In this process, ammonia is produced by reacting a mixture of hydrogen and nitrogen gases over an iron-based catalyst at high temperature, typically at about 400° C. to about 500° C., and at high pressure, typically at a pressure in the range from about 100 bar to 200 bar. Or alternatively, at least some, e.g. all, of the compressed hydrogen gas could be liquefied by cryogenic cooling. Or, a first part of the compressed hydrogen gas could be used to produce ammonia and a second part of the compressed hydrogen gas could be liquefied.

Apparatus

According to a second aspect of the present invention, there is provided an apparatus for producing compressed hydrogen gas, the apparatus comprising:
a plurality of electrolysers arranged in parallel for electrolysing water to provide hydrogen gas;
an electricity generation system for generating electricity to power the plurality of electrolysers, the electricity generation system being in electrically conductive communication with the plurality of electrolysers;
a multistage compression system for compressing the hydrogen gas to provide a compressed hydrogen gas, the multistage compression system comprising a feed end, an outlet end and at least one centrifugal compression stage having a pre-determined feed temperature and pressure and wherein hydrogen gas is fed to the feed end having a pre-determined relative humidity, the feed end being in fluid flow communication with the plurality of electrolysers via a feed header;
a saturator for adding water and heat to the hydrogen gas upstream of the centrifugal compression stage as required for humidifying the hydrogen gas to the pre-determined relative humidity at the pre-determined feed temperature and pressure; and
a separator for removing excess liquid water from the hydrogen gas upstream of the centrifugal compression stage.

Electrolysers

The electrolysis of water is provided by a plurality of electrolysis units or "cells". Each unit or cell may be referred to as an "electrolyser".

The plurality of electrolysers may have a total capacity of at least 1 GW. The maximum total capacity of the electrolysers is limited only by practical considerations, e.g. generating sufficient power from the renewable energy source(s) to power the plurality of electrolysers. Thus, the electrolysers may have a maximum total capacity of 10 GW or more. The total capacity of the electrolysers conducting the electrolysis may be from 1 GW to 5 GW, e.g. from about 1.5 GW to about 3 GW.

The plurality of electrolysers usually consists of a large number, e.g. hundreds, of individual cells combined into "modules" that also include process equipment, e.g. pumps, coolers, and/or separators, etc., and groups of these modules are typically arranged in separate buildings.

Each module typically has a maximum capacity of at least 10 MW, e.g. 20 MW, and each building typically has a total capacity of at least 100 MW, e.g. 400 MW.

Any suitable type of electrolyser may be used with the present invention. In this regard, there are three conventional types of electrolyser—alkaline electrolysers, PEM electrolysers and solid oxide electrolysers—and each of these types of electrolyser is in theory suitable for use with the present invention.

Alkaline electrolysers operate via transport of hydroxide ions ($OH^-$) through the electrolyte from the cathode to the anode with hydrogen being generated on the cathode side. Electrolysers using a liquid alkaline solution of sodium hydroxide or potassium hydroxide as the electrolyte are commercially available. Commercial alkaline electrolysers typically operate at a temperature in the range of about 100° C. to about 150° C.

In a PEM electrolyser, the electrolyte is a solid plastics material. Water reacts at the anode to form oxygen and positively charged hydrogen ions. The electrons flow through an external circuit and the hydrogen ions selectively move across the PEM to the cathode. At the cathode, hydrogen ions combine with electrons from the external circuit to form hydrogen gas. PEM electrolysers typically operate at a temperature in the range of about 70° C. to about 90° C.

Solid oxide electrolysers use a solid ceramic material as the electrolyte that selectively conducts negatively charged oxygen ions ($O^{2-}$) at elevated temperatures. Water at the cathode combines with electrons from the external circuit to form hydrogen gas and negatively charged oxygen ions. The oxygen ions pass through the solid ceramic membrane and react at the anode to form oxygen gas and generate electrons for the external circuit. Solid oxide electrolysers must operate at temperatures high enough for the solid oxide membranes to function properly, e.g. at about 700° C. to about 800° C.

Due to the lower operating temperatures, the use of alkaline electrolysers and/or PEM electrolysers are typically preferred.

The plurality of electrolysers may be arranged in at least two parallel groups. In these embodiments, the apparatus comprises:
  a first header to collect hydrogen gas from each electrolyser in each group; and
  a second header to collect hydrogen gas from the first headers and feed the hydrogen gas to the feed end of the multistage compression system.

In some embodiments, wherein the apparatus further comprises a storage system for excess hydrogen, the apparatus comprises a conduit for feeding compressed hydrogen gas from the storage system after suitable pressure reduction to the second header.

Electricity Generation System for Electrolysers

Electricity for the electrolysis may be generated from any suitable energy source, including renewable or non-renewable energy sources. Preferably, the electricity may be generated from at least one renewable energy source, e.g. wind energy and/or solar energy.

In embodiments in which wind energy is used to generate electricity, the electricity generation system will comprise a plurality of wind turbines. In embodiments in which solar energy is used to generate electricity, the electricity generation system will comprise a plurality of photovoltaic cells, or "solar cells".

Some embodiments will comprise a plurality of wind turbines and a plurality of photovoltaic cells.

The expression "electrically conductive communication" will be understood to mean that appropriate wires and/or cables will be used, together with any other relevant equipment, to connect the electricity generation system with the electrolysers in a safe and efficient manner.

Multistage Compression System

In the present invention, the multistage compression system comprises at least one centrifugal compression stage. As mentioned above, the multistage compression system may comprise a plurality of stages typically having a compression ratio in the range of about 1.5 to about 2.5, e.g. about 2 to about 2.5. Inter-coolers are typically provided between adjacent stages, and after-coolers may be required after a final stage.

The stages of a multistage compression system are also arranged in one or more compression sections. Each section may comprise one or more stages of compression, together with the associated coolers.

In particular embodiments, the multistage compression system has two sections, a first (low pressure or "LP") section in which hydrogen gas is compressed from the feed pressure to the multistage compression system to a first elevated pressure, and a second (medium pressure or "MP") section in which hydrogen gas is compressed from the first elevated pressure to the final elevated pressure desired for the downstream process(es).

An LP section may have one or more, e.g. two, stages of compression and an MP section may have two or more, e.g. 3 or 4, stages of compression. In some embodiments, the LP and MP sections may both comprise centrifugal compression stages. In other embodiments, the LP and/or MP section may comprise a combination of centrifugal and reciprocating compressors. In some embodiments, the LP section comprises at least one centrifugal compression stage, and the MP section comprises at least one reciprocating compression stage. In some embodiments, the LP section comprises at least one centrifugal compression stage, and the MP section comprises centrifugal and/or reciprocating compression stages. It will be envisaged that in some particularly preferred embodiments all stages of the multistage compression system are centrifugal compression stages.

By way of example, for a process having a total electrolyser capacity of 1 GW, the multistage compression system may have from 2 to 4 compressors. The skilled person would appreciate that a process having a higher total capacity would require a greater number of compressors, i.e. 5 compressors in a multistage compression system for a process having a total electrolyser capacity of 2 GW.

Compressors in an LP section may be oversized as appropriate, e.g. by 10%, to accommodate the loss of a machine. Additionally or alternatively, the multistage compression system may comprise a spare compressor in either the LP or an MP section which would cut-in to replace another machine in the relevant section that had broken down.

As mentioned above, the multistage compression system may comprise a single section. In these embodiments, the section may comprise a plurality of compressors arranged in parallel, each compressor comprising at least one centrifugal compression stage. The apparatus may further comprise a third header to collect compressed hydrogen gas from each compressor and feed the compressed hydrogen gas to at least one downstream processing unit, or to a purification system upstream of at least one downstream process unit.

In some embodiments where a storage system is used, the apparatus may further comprise a conduit for feeding compressed hydrogen gas from the storage system after suitable pressure reduction to the second header.

However, the multistage compression system may comprise:
  a first section comprising a plurality of compressors arranged in parallel, each compressor comprising at least one stage; and
  a second section downstream of the first section, the second section comprising a plurality of compressors arranged in parallel, each compressor comprising at least two stages arranged in series.

In these embodiments, the apparatus may comprise:
- a third header to collect compressed hydrogen gas from each compressor in the first section and feed the compressed hydrogen gas to the compressors of the second section; and
- a fourth header to collect compressed hydrogen gas from each compressor in the second section and feed compressed hydrogen gas to the downstream processing unit(s), or to a purification system upstream of the downstream process unit(s).

In some embodiments where a storage system is used, the apparatus may further comprise a conduit for feeding compressed hydrogen gas from the storage system after suitable pressure reduction to the third header.

The plurality of electrolysers may be arranged in at least two groups. In these embodiments, the multistage compression system may comprise:
- a first section comprising a plurality of compressors arranged in parallel in at least two groups, each compressor comprising at least two stages arranged in series; and
- a second section downstream of the first section, the second section comprising a plurality of compressors arranged in parallel, each compressor comprising at least two stages arranged in series.

The apparatus may further comprise:
- at least two first headers, each first header to collect hydrogen gas from each electrolyser in a group and feed the hydrogen gas to the feed end of a respective group of compressors in the first section of the multistage compression system;
- a second header to collect compressed hydrogen gas from each group of compressors in the first section and feed the compressed hydrogen gas to the compressors of said second section; and
- a third header to collect compressed hydrogen gas from each compressor in the second section and feed the compressed hydrogen gas to the downstream processing unit(s), or to a purification system upstream of the downstream process unit(s).

In some embodiments where a storage system is used, the apparatus may further comprise a conduit for feeding compressed hydrogen gas from the storage system after suitable pressure reduction to at least one of said first headers. Additionally or alternatively, the apparatus of these embodiments may comprise a conduit for feeding compressed hydrogen gas from the storage system after suitable pressure reduction to the second header.

Each stage of compression in the multistage compression system will have a pre-determined feed temperature and pressure for optimal compression at that stage. The preferred ranges for these values are identical to those described above in relation to the process for implementing the present invention. Each stage of compression will also have a pre-determined relative humidity. Preferably, the pre-determined relative humidity for all stages of centrifugal compression is the same.

Saturator

The apparatus comprises a saturator for adding water and heat to the hydrogen gas upstream of the centrifugal compression stage as required for humidifying the hydrogen gas to the pre-determined relative humidity at the pre-determined feed temperature and pressure.

The saturator may comprise a valve for controlling the flowrate of the water to be added.

It may also comprise an external heat exchanger to control the temperature of the water (and thus amount of heat) to be added, or it may comprise a feed line and valve which supplies heated or cooled water externally to alter the temperature of the water to be added.

In some embodiments, the saturator is configured to inject water and heat as steam, preferably, as de-superheated steam. Thus, in some embodiments the saturator is in fluid flow communication with a superheated steam generation system and a water feed line which adds water to de-superheat the steam before it is added to the hydrogen gas. The steam or de-superheated steam may be injected using a T-junction, for example.

Separator

The apparatus comprises a separator for removing excess liquid water from the hydrogen gas upstream of the centrifugal compression stage.

In some embodiments, the separator is a phase separator, wherein humidified hydrogen gas is separated from any liquid water before being fed to the centrifugal compression stage.

In some embodiments, the apparatus comprises a return line which transports the excess liquid water for treatment or to at least in part be reused as the water to be added to the hydrogen gas for humidification or cooling.

Saturator-Separator

In some embodiments, the saturator and separator are combined in a single unit. Thus, one unit is for adding water and heat to the hydrogen gas upstream of the centrifugal compression stage as required for humidifying the hydrogen gas to the pre-determined relative humidity at the pre-determined feed temperature and pressure, and simultaneously for removing excess liquid water from the hydrogen gas upstream of the centrifugal compression stage.

In some embodiments, the combined saturator-separator is a saturation column having a top, a bottom, and a heat and/or mass transfer zone located therebetween. In some embodiments, the heat and/or mass transfer zone comprises structured packing or random packing of heat and/or mass transfer elements. The heat and/or mass transfer elements may comprise, including but not limited to, corrugated sheets packed in blocks (made of plastic or metals such as aluminium), or gauze plates with packed rings or pebbles therebetween, or distillation trays, for example. The excess liquid water is removed from the bottom of the saturation column. Humidified hydrogen gas is fed from the top before being fed to the centrifugal compression stage.

In still further embodiments, the combined saturator-separator is a direct contact cooler having a top, a bottom and at least one heat and/or mass transfer zone located therebetween. The direct contact cooler may contain substantially the same components as a saturation column described above. The excess liquid water is removed from the bottom of the direct contact cooler. Humidified hydrogen gas is fed from the top of the direct contact cooler before being fed to the centrifugal compression stage.

Recycle System

In some embodiments, the apparatus comprises a recycle system for recycling a portion of the hydrogen gas from a product end to a feed end of the centrifugal compression stage. The recycled portion of the hydrogen gas is removed and is reduced by a valve to the pre-determined feed pressure at the feed end without any cooling.

By removing the compressed hydrogen gas and reducing it in pressure to the pre-determined feed pressure without any cooling, the recycled portion of the hydrogen gas does not experience any loss of water vapour, and so there is no drop in apparent molecular weight when recycling.

Water Recycle System

In some embodiments, the apparatus comprises a water recycle system comprising:
- a pump for pumping the excess liquid water from the separator;
- a cooler in fluid flow communication with the pump, wherein the cooler is configured for cooling compressed hydrogen gas from the outlet of the centrifugal compression stage by indirect heat exchange against the pumped excess liquid water; and
- a return feed line in fluid flow communication with the cooler, the return feed line comprising a valve which feeds the excess liquid water, after suitable pressure reduction, to the saturator to form at least part of the water and heat to be added to the hydrogen gas.

The pump may be any water pump known in the art and suitable for pumping the excess liquid water. The cooler may be any cooler known in the art suitable for carrying out indirect heat exchange, including but not limited to a shell-and-tube heat exchanger, for example.

Purification System

In embodiments where there is a downstream process(es) that cannot tolerate the levels of water and oxygen inherently present in the compressed hydrogen gas produced by the electrolysis of water, the apparatus may comprise a purification system in which the compressed hydrogen gas is purified.

The purification system will typically comprise a "DeOxo" unit in which oxygen is removed by the catalytic combustion of hydrogen to produce water and oxygen-depleted compressed hydrogen gas.

The oxygen-depleted gas may then be dried in a drier, e.g. an adsorption unit, such as a temperature swing adsorption (TSA) unit, to produce dry compressed hydrogen gas for the downstream process(es).

Downstream Processing Unit(s)

In some embodiments there may be a downstream processing unit(s). A downstream processing unit may be any unit that utilises hydrogen gas as a feedstock.

Examples of suitable downstream processing units include an oil refinery, a steel manufacturing facility, an ammonia synthesis plant or a hydrogen liquefaction plant. In some embodiments, there is both an ammonia synthesis plant and a hydrogen liquefaction plant arranged in parallel.

Storage System

In some embodiments, the apparatus comprises a hydrogen gas storage system for storing compressed hydrogen gas. In such embodiments, the storage system is in fluid flow communication with the outlet end of the multistage compression system and at least one compression stage of the multistage compression system.

The storage system typically comprises a number of pressure vessels and/or pipe segments connected to a common inlet/outlet header.

The pressure vessels may be spheres, e.g. up to about 25 m in diameter, or "bullets", i.e. horizontal vessels with large L/D ratios (typically up to about 12:1) with diameters up to about 12 m.

Salt domes may also be used if the geology of the site allows.

Control System

In some embodiments, the apparatus comprises a control system for monitoring and controlling temperature (and/or flowrate) of the water added to the hydrogen gas for humidification (and/or heating/cooling, as the case may be), wherein the temperature (and/or flowrate) is determined based on the temperature and mole fraction of water in the hydrogen gas. It will be appreciated that the above features described in relation to the method of the present invention could be implemented using such a control system.

In embodiments where hot recycled hydrogen gas is added to the hydrogen gas feed to the centrifugal compression stage, the control system may also be configured to monitor the amount of the hydrogen gas being recycled from the product end to the feed end of the (further) centrifugal compression stage by a recycle system. Thus, the control system then determines the temperature (and/or flowrate) of the water to be added to maintain the temperature and relative humidity of the hydrogen gas being fed to the (further) centrifugal compression stage at the pre-determined feed temperature and pre-determined relative humidity.

In some embodiments, the control system may implement a feedback loop, which takes into account information about the temperature and/or relative humidity of the hydrogen gas being fed to the (further) centrifugal compression stage.

In embodiments where the pre-determined relative humidity is about 100%, water can be added in excess and a control system only varies the temperature of it. The temperature of the water can be controlled such that the hydrogen gas being fed to the (further) centrifugal compression stage is at substantially the pre-determined feed temperature. The addition of water in excess results in a mole fraction of water in the hydrogen gas that is maximised for that temperature, thereby providing the hydrogen gas feed with the pre-determined relative humidity of about 100% at the pre-determined feed temperature.

This advantageously allows for the temperature and relative humidity of the hydrogen gas being fed to the (further) centrifugal compression stage to be maintained at the pre-determined levels. This is despite variations in the humidity of the hydrogen gas source (due to the hydrogen gas containing recycled cooled hydrogen gas or dry hydrogen gas from storage) and despite variations in the temperature of the hydrogen gas (due to hydrogen gas containing hot recycled hydrogen gas).

In embodiments where a storage system is used, the apparatus may comprise a control system which controls not only the pressure and flow of compressed hydrogen from the multistage compression system to the storage system, e.g. during periods when hydrogen production exceeds demand, but also the pressure and flow of compressed hydrogen gas to the multistage compression system from the storage system, e.g. during periods when hydrogen demand exceeds production.

In some embodiments, the control system would simply seek to maintain the pressure of hydrogen gas in a downstream header to the downstream process. Thus, in order to continually provide a given amount of hydrogen to a downstream process, a pressure controller would be maintained on a discharge header that feeds the downstream process.

If the pressure in the discharge header exceeded the required feed pressure (e.g. because there is more hydrogen available than the downstream process is consuming), the pressure would be relieved by opening a valve in the feed line to storage.

Once the pressure in the discharge header dropped to the required feed pressure, the valve in the feed line to storage would be closed.

If the pressure in the discharge header dropped below the required feed pressure (e.g. because there is less hydrogen available than the downstream process is consuming), the pressure would be increased by opening a valve in a first return line from storage to a first stage in the multistage compression system.

The valve in the first return line would remain open until such time that the pressure in the discharge header exceeded the required feed pressure, indicating that the level of hydrogen production has returned to the required level, at which point the valve would be closed, or until the pressure in the storage vessel drops to about the inlet pressure to the first stage of multistage compression system being fed by the first return line.

In the latter case, not only would the valve in the first return line be closed, but also a valve in a second return line from storage to a second stage in the multistage compression system (upstream of the first stage) would be opened so as to continue to feed hydrogen from storage back to the downstream process.

Such a control system may be referred to as a "split range" control system.

Water Source

Any suitable source of water may be used with the present invention. However, in embodiments in which sea water is used to produce the water for the electrolysis, the apparatus would further comprise at least one unit (or plant) for desalination and demineralisation of the sea water.

Aspects

1. A process for producing compressed hydrogen gas, said process comprising:
  electrolysing water to produce hydrogen gas; and
  compressing said hydrogen gas in a multistage compression system to produce compressed hydrogen gas,
  wherein the multistage compression system comprises at least one centrifugal compression stage, and the hydrogen gas is fed to the centrifugal compression stage at a pre-determined feed temperature and pressure and having a pre-determined relative humidity, and
  wherein the process comprises adding water and heat to the hydrogen gas upstream of the centrifugal compression stage as required to humidify the hydrogen gas to the pre-determined relative humidity.
2. The process according to Aspect #1, wherein the pre-determined relative humidity is from about 70 up to 100%.
3. The process according to any of Aspects #1-2, wherein water is added in excess to humidify the hydrogen gas, and the pre-determined relative humidity is about 100%.
4. The process according to any of Aspects #1-3, wherein the hydrogen gas is humidified by:
  measuring the mole fraction of water in the hydrogen gas upstream of the centrifugal compression stage;
  injecting water into the hydrogen gas at a flowrate and temperature,
  wherein the flowrate and temperature of the water being injected is controlled as required based on the measured mole fraction of water.
5. The process according to any of Aspects #1-4, wherein the pre-determined feed temperature is from about 20 to about 60° C.
6. The process according to any of Aspects #1-5, wherein the hydrogen gas being fed to the centrifugal compression stage has an apparent molecular weight in a range from about 2.2 to about 3.5.
7. The process according to any of Aspects #1-6, wherein the centrifugal compression stage is a first or initial stage in the multistage compression system.
8. The process according to any of Aspects #1-7, wherein the compressed hydrogen gas is consumed in at least one downstream process, and wherein during periods when more hydrogen gas is produced by the electrolysis than is required by the downstream process(es), the process comprises feeding excess compressed hydrogen gas to storage, optionally after further compression; and
  wherein during periods when more hydrogen gas is required by the downstream process(es) than is produced by the electrolysis, the process comprises withdrawing compressed hydrogen gas from storage and, after suitable pressure reduction, feeding the reduced pressure hydrogen gas to a stage of the multistage compression system.
9. The process according to any of Aspects #1-8, wherein the centrifugal compression stage comprises an outlet end and a feed end, and the hydrogen gas being fed to the feed end contains recycled hydrogen gas taken from the outlet end after suitable pressure reduction.
10. The process according to any of Aspects #1-9, wherein the hydrogen gas is fed to the centrifugal compression stage at the pre-determined feed temperature by controlling temperature and/or flow rate of the water being added.
11. The process according to any of Aspects #1-10, wherein the multistage compression system comprises a first section and at least one further section downstream of the first section.
12. The process according to any of Aspects #1-11, wherein all stages of the multistage compression system are centrifugal compression stages.
13. The process according to any of Aspects #1-12, wherein the water and heat are added as steam to form a combined steam/hydrogen stream.
14. The process according to Aspect #13, wherein the steam is de-superheated steam.
15. The process according to Aspect #14, wherein liquid water is added to superheated steam to provide the de-superheated steam.
16. The process according to any of Aspects #13-15, wherein the combined steam/hydrogen stream passes through a phase separator to remove liquid water from the hydrogen gas which is then fed to the centrifugal compression stage.

17. The process according to any of Aspects #1-12, wherein the water and heat are added as liquid water to produce a two-phase combined stream.

18. The process according to Aspect #17, wherein the two-phase combined stream passes through a static mixer prior to being fed to a phase separator to remove excess liquid water from the hydrogen gas which is then fed to the centrifugal compression stage.

19. The process according to Aspect #18, comprising:
pumping the liquid water from the phase separator to produce pumped liquid water;
cooling compressed hydrogen gas by indirect heat exchange against the pumped liquid water in a cooler to produce cooled compressed hydrogen gas and warmed liquid water;
reducing the pressure of the warmed liquid water to produce reduced pressure recycle water; and
using said reduced pressure recycle water as at least part of the liquid water being added to the hydrogen gas to form the two-phase combined stream.

20. The process according to Aspect #19 comprising adding make-up water to the reduced pressure recycle water as required.

21. The process according to any of Aspects #1-12, wherein the water is in the form of liquid water, said process comprising:
humidifying the hydrogen gas with the liquid water in a saturation column having a top, a bottom and at least one heat and/or mass transfer zone located therebetween;
removing humidified hydrogen gas from the top of the saturation column and feeding the humidified hydrogen gas to the centrifugal compression stage; and
removing excess liquid water from the bottom of the saturation column.

22. The process according to Aspect #21, comprising:
pumping the liquid water from the saturation column to produce pumped liquid water;
cooling compressed hydrogen gas by indirect heat exchange against the pumped liquid water in a cooler to produce cooled compressed hydrogen gas and warmed liquid water;
reducing the pressure of the warmed liquid water to produce reduced pressure recycle water; and
using said reduced pressure recycle water as at least part of the liquid water being used to humidify the hydrogen gas in the saturation column.

23. The process according to Aspect #22 comprising adding make-up water to the hydrogen gas or reduced pressure recycle water, as required.

24. The process according to any of Aspects #1-12, wherein the water is in the form of liquid water, said process comprising:
humidifying the hydrogen gas with the liquid water in a first direct contact cooler having a top, a bottom and at least one heat and/or mass transfer zone located therebetween;
removing humidified hydrogen gas from the top of the first direct contact cooler and feeding the humidified hydrogen gas to the centrifugal compression stage for compression to produce compressed hydrogen gas; and
removing excess liquid water from the bottom of the first direct contact cooler;
recycling as required a portion of the compressed hydrogen gas produced in the centrifugal compression stage to the first direct contact cooler after suitable pressure reduction and without any cooling.

25. The process according to Aspect #24, wherein the centrifugal compression stage is an initial stage or an intermediate stage of the multistage compression system, said process comprising:
humidifying compressed hydrogen gas from the centrifugal compression stage with liquid water in a second direct contact cooler having a top, a bottom and at least one heat and/or mass transfer zone located therebetween;
removing humidified hydrogen gas from the top of the second direct contact cooler and feeding the humidified hydrogen gas as a feed stream to a further centrifugal compression stage for compression to produce further compressed hydrogen gas; and
removing excess liquid water from the bottom of the second direct contact cooler.

26. The process according to Aspect #25, comprising recycling as required a portion of the further compressed hydrogen gas produced in the further centrifugal compression stage to the hydrogen gas feed to the second direct contact cooler after suitable pressure reduction and without any cooling.

27. The process according to any of Aspects #24-26, wherein hydrogen from storage is added to the first and/or second direct contact cooler as required.

28. The process according to any of Aspects #24-26, wherein the temperature and/or flow rate of the liquid water being added to the first and/or second direct contact cooler is determined based on the temperature and/or relative humidity of the hydrogen gas being fed to the (further) centrifugal compression stage.

29. An apparatus for producing compressed hydrogen gas, the apparatus comprising:
a plurality of electrolysers arranged in parallel for electrolysing water to provide hydrogen gas;
an electricity generation system for generating electricity to power the plurality of electrolysers, the electricity generation system being in electrically conductive communication with the plurality of electrolysers;
a multistage compression system for compressing the hydrogen gas to provide a compressed hydrogen gas, the multistage compression system comprising a feed end, an outlet end and at least one centrifugal compression stage having a pre-determined feed temperature and pressure and wherein hydrogen gas is fed to the feed end having a pre-determined relative humidity, the feed end being in fluid flow communication with the plurality of electrolysers via a feed header;
a saturator for adding water and heat to the hydrogen gas upstream of the centrifugal compression stage as required for humidifying the hydrogen gas to the pre-determined relative humidity at the pre-determined feed temperature and pressure; and
a separator for removing excess liquid water from the hydrogen gas upstream of the centrifugal compression stage.

30. The apparatus according to Aspect #29, wherein the separator is a phase separator.

31. The apparatus according to Aspect #29, wherein the saturator and separator are combined as a single unit in the form of a saturation column having a top, a bottom and at least one heat and/or mass transfer zone located therebetween.

32. The apparatus according to Aspect #29, wherein the saturator and separator are combined as a single unit in the form of a direct contact cooler having a top, a bottom and at least one heat and/or mass transfer zone located therebetween, and the apparatus comprises:
a recycle system for recycling a portion of the hydrogen gas from a product end to a feed end of the centrifugal compression stage, wherein the recycled portion of the hydrogen gas is removed from the product end and is reduced by a valve to the pre-determined feed pressure at the feed end without any cooling.

33. The apparatus according to any of Aspect #29-31, comprising:
a water recycle system comprising:
a pump for pumping the excess liquid water from the separator;
a cooler in fluid flow communication with the pump, wherein the cooler is configured for cooling compressed hydrogen gas from the outlet of the centrifugal compression stage by indirect heat exchange against the pumped excess liquid water; and
a return line in fluid flow communication with the cooler, the return line comprising a valve which feeds the excess liquid water, after suitable pressure reduction, to the saturator to form at least part of the water and heat to be added to the hydrogen gas.

EXAMPLES

The invention will now be described by example only and with reference to the figures in which.

Figure 1:
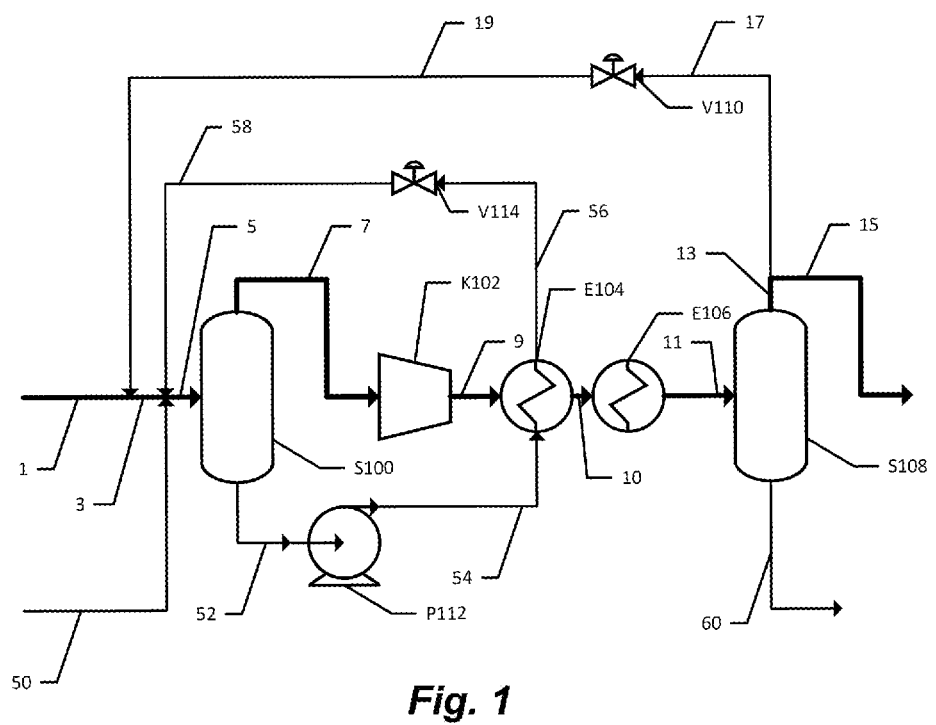
FIG. 1 is a simplified flowsheet of an embodiment of the present invention involving liquid water injection.

According to FIG. 1, which shows a first example of the present invention, the hydrogen gas feed 1 may be dry, partially, or fully saturated with water depending on its source and the desired operating mode.

A recycle feed (17, V110 and 19) collects hydrogen gas from the end of the stage in stream 17 and recycles it around the stage and, after suitable pressure reduction in valve V110, mixes as stream 19 with the feed 1 to the stage. The recycle feed (17, V110 and 19) is used intermittently depending on the operating conditions, such as when the hydrogen gas flow entering the compressor K102 is below a specified level, for example.

The recycle stream 17 has a 100% relative humidity at the stage discharge conditions (i.e. at the discharge temperature and pressure) despite losing water content in the cooling units E104 and E106. However, once the recycle stream is reduced in pressure at valve V110 to match the stage feed conditions (i.e. the pre-determined feed temperature and pressure), the relative humidity will be below 100%.

The mixed stream 3 therefore has variable humidity, and the system depicted in FIG. 1 ensures that it is always saturated at 100% relative humidity at a constant temperature as it enters the compressor stage K102.

Recirculated hot water 58 is mixed with mixed stream 3, along with make-up water 50 if required, and fed as stream 5 to the phase separator S100. A static mixing device (not shown) may be used in the pipework containing stream 5 to ensure good contact between gas and liquid. Alternatively, the recirculated hot water 58 can be sprayed directly into the separator S100 (not shown). Stream 7 leaves the separator S100 and contains hydrogen gas saturated with water i.e. with a relative humidity of 100% at the stage inlet conditions. Stream 7 is then fed to the compressor stage K102. Excess liquid water stream 52 is removed from the phase separator S100 and is now at the same temperature as stream 7. Stream 52 is recirculated through pump P112, heated in the indirect heat exchange cooler E104 against the flow of hot compressed hydrogen gas stream 9 from compressor K102, to provide warmed liquid water stream 56. Stream 56 has its flow controlled by valve V114 before being added to the mixed stream 3 as recirculated hot water stream 58.

The flow and/or temperature of recirculating water stream 58 is adjusted to maintain the correct temperature and humidity in stream 7. The temperature of stream 58 may be adjusted by bypassing at least part of the flow around the indirect heat exchange cooler E104.

Compressed hydrogen in stream 9 from the stage K102 is cooled in the indirect heat exchange cooler E104 against heating of the recirculating water stream 54 to provide stream 10. Stream 10 is then further cooled in additional cooling unit E106 against cooling water. Coolers E104 and E106 could be combined within a single shell (not shown). Equally, stream 54 could be heated by an external source of heat (not shown) rather than stream 9.

Finally, the cooled compressed hydrogen stream 11, which contains some condensed water has the excess liquid water 60 separated in phase separator S108 to provide stream 13 of compressed hydrogen gas which is saturated at the stage discharge conditions (i.e. discharge temperature and pressure). Stream 13 is then split into the product from the stage as stream 15 and the recycle stream 17 for recycling around the stage as required. The recycle valve V110 controls the recycle flow around the stage.

The system depicted in FIG. 1 will now be explained in more detail with reference to three Examples 1A, 1B and 1C which contain simulated data. This data was generated using a computer simulation package, Aspen Plus with version no. 10.

Example 1A

| Stream | 1 | 3 | 5 | 7 | 9 | 10 | 11 | 13 | 15 |
|---|---|---|---|---|---|---|---|---|---|
| Temp., °C. | 40.0 | 40.0 | 40.0 | 40.0 | 140.9 | 53.9 | 40.0 | 40.0 | 40.0 |
| P, bar | 1.10 | 1.10 | 1.10 | 1.10 | 2.54 | 2.52 | 2.50 | 2.50 | 2.50 |
| Molar Flow, kmol/hr | 1000.0 | 1000.0 | 1997.0 | 1072.0 | 1072.0 | 1072.0 | 1072.0 | 1030.5 | 1030.5 |
| Vap. Fract. | 1.00 | 1.00 | 0.54 | 1.00 | 1.00 | 0.99 | 0.96 | 1.00 | 1.00 |
| Mol. fract. Water | 0.0000 | 0.0000 | 0.4992 | 0.0672 | 0.0672 | 0.0672 | 0.0672 | 0.0296 | 0.0296 |
| Relative humidity | 0% | 0% | 100% | 100% | 5% | 100% | 100% | 100% | 100% |
| Mol. wt. | 2.016 | 2.016 | 10.003 | 3.090 | 3.090 | 3.090 | 3.090 | 2.490 | 2.490 |

| Stream | 17 | 19 | 50 | 52 | 54 | 56 | 58 | 60 |
|---|---|---|---|---|---|---|---|---|
| Temp., °C. |  |  | 40.0 | 40.0 | 40.0 | 85.0 | 85.0 | 40.0 |
| P, bar |  |  | 1.10 | 1.10 | 3.00 | 2.50 | 1.10 | 2.50 |
| Molar Flow, kmol/hr | 0.0 | 0.0 | 72.0 | 925.0 | 925.0 | 925.0 | 925.0 | 41.5 |
| Vap. Fract. |  |  | 0.00 | 0.00 | 0.00 | 0.00 | 0.00 | 0.00 |
| Mol. fract. Water |  |  | 1.0000 | 1.0000 | 1.0000 | 1.0000 | 1.0000 | 1.0000 |

Example 1A shows an example with a completely dry hydrogen feed 1 (with a relative humidity of 0%). There is no recycle (from streams 17 and 19) because the hydrogen gas in feed 1 is at a full molar flow of 1000 kmol/hr. The make-up water 50 provides all the water needed to saturate the hydrogen gas to the pre-determined relative humidity of 100% at the stage inlet conditions (40° C., 1.1 bar), whilst the recirculating water 58 at 85° C. provides the heat for humidification.

It can be seen from this example that the injection of water and heat increases the apparent molecular weight, and thus, the relative humidity of the hydrogen gas feed to the compression stage. This leads to optimal performance of the centrifugal compression stage.

Example 1B

| Stream | 1 | 3 | 5 | 7 | 9 | 10 | 11 | 13 | 15 |
|---|---|---|---|---|---|---|---|---|---|
| Temp., °C. | 40.0 | 40.0 | 40.0 | 40.0 | 140.9 | 140.9 | 40.0 | 40.0 | 40.0 |
| P, bar | 1.10 | 1.10 | 1.10 | 1.10 | 2.54 | 2.52 | 2.50 | 2.50 | 2.50 |
| Molar Flow, kmol/hr | 1072.0 | 1072.0 | 1997.0 | 1072.0 | 1072.0 | 1072.0 | 1072.0 | 1030.5 | 1030.5 |
| Vap. Fract. | 1.00 | 1.00 | 0.54 | 1.00 | 1.00 | 1.00 | 0.96 | 1.00 | 1.00 |
| Mol. fract. Water | 0.0671 | 0.0671 | 0.4992 | 0.0672 | 0.0672 | 0.0672 | 0.0672 | 0.0296 | 0.0296 |
| Relative humidity | 100% | 100% | 100% | 100% | 5% | 5% | 100% | 100% | 100% |
| Mol. wt. | 3.090 | 3.090 | 10.003 | 3.091 | 3.091 | 3.091 | 3.091 | 2.490 | 2.490 |

| Stream | 17 | 19 | 50 | 52 | 54 | 56 | 58 | 60 |
|---|---|---|---|---|---|---|---|---|
| Temp., °C. |  |  | 40.0 | 40.0 | 40.0 | 40.0 | 40.1 | 40.0 |
| P, bar |  |  | 1.10 | 1.10 | 3.00 | 2.50 | 1.10 | 2.50 |
| Molar Flow, kmol/hr | 0.0 | 0.0 | 0.0 | 925.0 | 925.0 | 925.0 | 925.0 | 41.5 |
| Vap. Fract. |  |  | 0.00 | 0.00 | 0.00 | 0.00 | 0.00 | 0.00 |

Example 1B is the same as Example 1A except that the hydrogen feed is a water-saturated feed with a relative humidity of 100% at the stage inlet conditions (40° C., 1.1 bar). This Example uses the same recirculating water flow as Example 1A, but the temperature is not increased because the indirect heat exchange cooler E104 is bypassed. Also, no make-up water 50 is needed. This example gives an indication of how the temperature of stream 7 entering the compressor K102 might be held constant as the feed changes in humidity—there could be a variable bypass of E104.

It can be seen from this example that by maintaining the temperature of feed 7 to the compressor K102 at the pre-determined temperature, the humidity is also kept constant. This leads to optimal compressor performance.

In Example 1C, the feed 1 is still saturated with a relative humidity of 100%. But the feed 1 has a hydrogen gas flow which is 30% of full flow (321.6 kmol/hr). To maintain the molar flow through the compressor K102 at 100% (assuming it does not turn down beyond this), there is a significant molar flow in the recycle loop (17 and 19).

The flowrate of the recirculating water 58 is the same as Examples 1A and 1B, but the temperature of stream 56 and 58 imparted from the indirect heat exchange cooler E104 is changed to achieve the pre-determined feed temperature (at 40° C.) in stream 7 to the compression stage.

Example 1C

| Stream | 1 | 3 | 5 | 7 | 9 | 10 | 11 | 13 | 15 |
|---|---|---|---|---|---|---|---|---|---|
| Temp., °C. | 40.0 | 40.0 | 40.0 | 40.0 | 140.9 | 101.1 | 40.0 | 40.0 | 40.0 |
| P, bar | 1.10 | 1.10 | 1.10 | 1.10 | 2.54 | 2.52 | 2.50 | 2.50 | 2.50 |
| Molar Flow, kmol/hr | 321.6 | 1043.0 | 1997.0 | 1072.0 | 1072.0 | 1072.0 | 1072.0 | 1030.6 | 309.2 |
| Vap. Fract. | 1.00 | 1.00 | 0.54 | 1.00 | 1.00 | 1.00 | 0.96 | 1.00 | 1.00 |
| Mol. fract. Water | 0.0671 | 0.0412 | 0.4992 | 0.0672 | 0.0672 | 0.0672 | 0.0672 | 0.0296 | 0.0296 |
| Relative humidity | 100% | 61% | 100% | 100% | 5% | 16% | 100% | 100% | 100% |
| Mol. wt. | 3.090 | 2.675 | 10.003 | 3.090 | 3.090 | 3.090 | 3.090 | 2.490 | 2.490 |

| Stream | 17 | 19 | 50 | 52 | 54 | 56 | 58 | 60 |
|---|---|---|---|---|---|---|---|---|
| Temp., °C. | 40.0 | 40.0 | 40.0 | 40.0 | 40.0 | 58.2 | 58.3 | 40.0 |
| P, bar | 2.50 | 1.10 | 1.10 | 1.10 | 3.00 | 2.50 | 1.10 | 2.50 |
| Molar Flow, kmol/hr | 721.4 | 721.4 | 29.0 | 925.0 | 925.0 | 925.0 | 925.0 | 41.5 |
| Vap. Fract. | 1.00 | 1.00 | 0.00 | 0.00 | 0.00 | 0.00 | 0.00 | 0.00 |
| Mol. fract. Water | 0.0296 | 0.0296 | 1.0000 | 1.0000 | 1.0000 | 1.0000 | 1.0000 | 1.0000 |
| Relative humidity | 100% | 44% | | | | | | |
| Mol. wt. | 2.490 | 2.490 | | | | | | |

The hydrogen gas in recycle feeds 17 and 19 has been cooled in the additional cooling unit E106 and thus have reduced water mole fraction (0.0296) and a reduced apparent molecular weight (2.490) compared with the saturated hydrogen gas in feed 1. The result is a mixed feed 3 which has a relative humidity at the stage inlet conditions (40° C., 1.1 bar) which is below the pre-determined relative humidity (which here is 100%) of just 61%. Thus, the flow of makeup water 50 in this case provides the water to humidify the hydrogen gas in mixed stream 3 to increase the mole fraction of water and raise the apparent molecular weight. This maintains the relative humidity of the hydrogen gas stream 7 at the pre-determined relative humidity (at 100%) as it is fed to the centrifugal compression stage K102. At least part of stream 60 may then optionally be recycled as part of the make-up water in stream 50. This saves costs as stream 60 is already at an increased pressure, and reduces waste.

It can be seen from this example that the injection of water and heat increases the apparent molecular weight of the mixed feed 3 which may drop due to the use of a recycle. The relative humidity of the hydrogen gas feed to the compression stage is therefore maintained, which leads to optimal performance of the centrifugal compression stage The features in FIG. 2 that are common to FIG. 1 are not discussed further.

Figure 2:
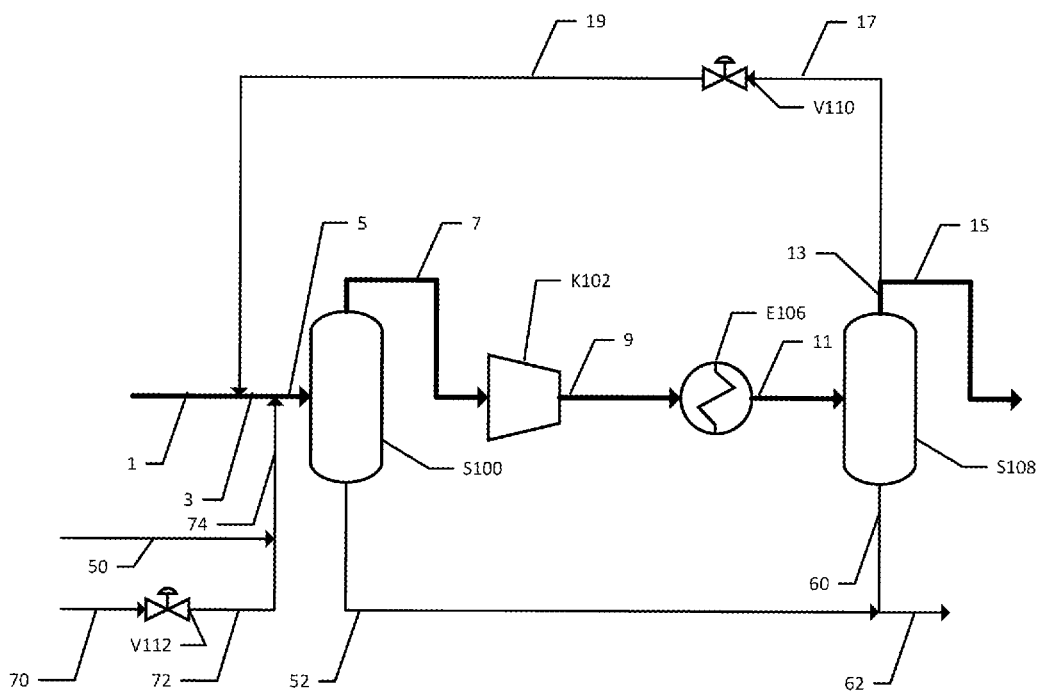
FIG. 2 is a simplified flowsheet of a further embodiment of the present invention involving injection of de-superheated steam.

According to FIG. 2, which shows a second example of the present invention, the hydrogen gas feed 1 and recycle stream 19 are mixed as before to form mixed stream 3. In this case, however, instead of hot water, steam is added as stream 74. In this Example the steam is de-superheated and formed by mixing water 50 with superheated steam 72. It is also desirable that stream 74 contains a small fraction (e.g. 5-10%) of liquid water. The flow of stream 74 is adjusted with valve V112 to control the temperature and mole fraction of water in stream 7 to ensure it is maintained at the pre-determined feed temperature and pre-determined relative humidity as it is fed to the compressor K102. Excess water (52 and 60) is separated in phase separators S100 and S108 and may be combined and returned as stream 62 for treatment and/or return to the steam generation system (not shown).

The system depicted in FIG. 2 will now be explained in more detail with reference to Example 2 below which contains simulated data. This data was generated using a computer simulation package, Aspen Plus with version no. 10.

Example 2

| Stream | 1 | 3 | 5 | 7 | 9 | 11 | 13 | 15 |
|---|---|---|---|---|---|---|---|---|
| Temp., °C. | 40.0 | 40.0 | 40.0 | 40.0 | 140.9 | 40.0 | 40.0 | 40.0 |
| P, bar | 1.10 | 1.10 | 1.10 | 1.10 | 2.54 | 2.50 | 2.50 | 2.50 |
| Molar Flow, kmol/hr | 321.6 | 1043.0 | 1072.0 | 1072.0 | 1072.0 | 1072.0 | 1030.5 | 309.2 |
| Vap. Fract. | 1.00 | 1.00 | 1.00 | 1.00 | 1.00 | 0.96 | 1.00 | 1.00 |
| Mol. fract. Water | 0.0671 | 0.0412 | 0.0671 | 0.0671 | 0.0671 | 0.0671 | 0.0296 | 0.0296 |
| Relative humidity | 100% | 61% | 100% | 100% | 5% | 100% | 100% | 100% |
| Mol. wt. | 3.090 | 2.675 | 3.090 | 3.090 | 3.090 | 3.090 | 2.490 | 2.490 |

| Stream | 17 | 19 | 50 | 52 | 60 | 70 | 72 | 74 |
|---|---|---|---|---|---|---|---|---|
| Temp., °C. | 40.0 | 40.0 | 40.0 | 40.0 | 40.0 | 200.0 | 193.8 | 102.3 |
| P, bar | 2.50 | 1.10 | 1.10 | 1.10 | 2.50 | 4.00 | 1.10 | 1.10 |
| Molar Flow, kmol/hr | 721.4 | 721.4 | 3.1 | 0.0 | 41.4 | 25.9 | 25.9 | 29.0 |
| Vap. Fract. | 1.00 | 1.00 | 0.00 | 0.00 | 0.00 | 1.00 | 1.00 | 0.95 |
| Mol. fract. Water | 0.0296 | 0.0296 | 1.0000 | 1.0000 | 1.0000 | 1.0000 | 1.0000 | 1.0000 |
| Relative humidity | 100% | 44% | | | | | | |
| Mol. wt. | 2.490 | 2.490 | | | | | | |

In Example 2 hydrogen gas feed 1 is a water-saturated feed with a relative humidity of 100% at the stage inlet conditions (40° C., 1.1 bar) but with a molar flow of 30% full flow. Thus, there is recycle flow in streams 17 and 19 to make up the compressor flow up to 100% in stream 7. Like Example 1C, the addition of hydrogen gas from recycle stream 19 results in a reduced apparent molecular weight in mixed stream 3, which has a relative humidity of 61% which is below the pre-determined relative humidity of 100%.

In this case, steam at 200° C. and 4 bar in stream 70 is reduced in pressure as stream 72 and mixed with water 50 to provide de-superheated steam in stream 74. Additional water 50 is added so that stream 74 is 5% liquid—this ensures that the temperature of the inlet 7 to the compression stage is not increased above the pre-determined feed temperature of 40° C.

The total water added by stream 74 is the same as the makeup water added in Example 1C to humidify the hydrogen gas stream 7 being fed to the compressor K102 to the predetermined relative humidity of 100% at the stage inlet conditions (40° C., 1.1 bar).

It can be seen from this example that the injection of steam increases the apparent molecular weight of the mixed feed 3 which may drop due to the use of a recycle. The relative humidity of the hydrogen gas feed to the compression stage is therefore maintained, which leads to optimal performance of the centrifugal compression stage.

Figure 3:
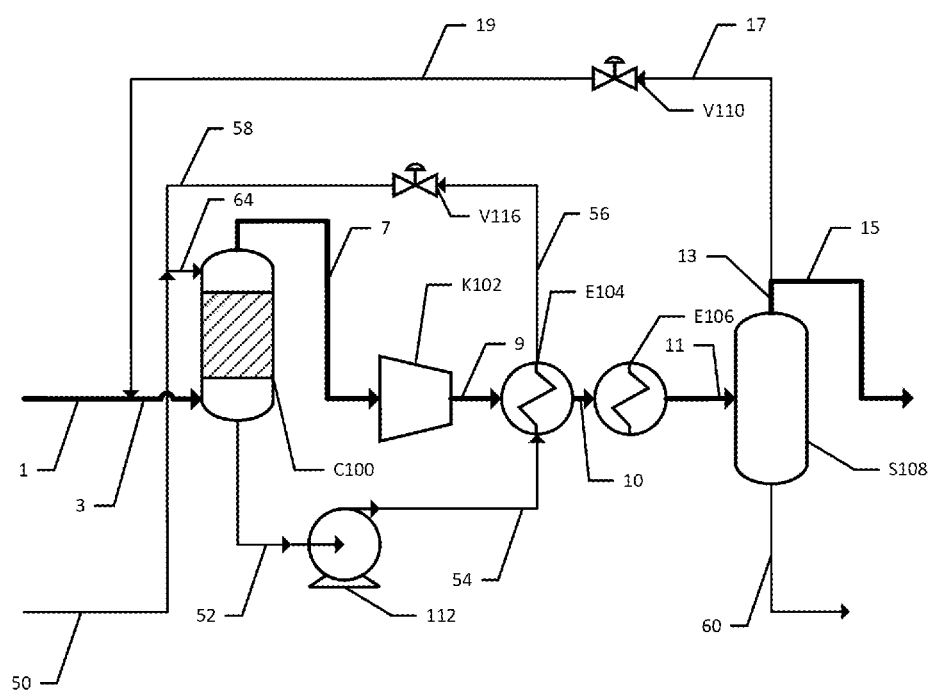
FIG. 3 is a simplified flowsheet of a still further embodiment of the present invention involving using a saturation column.

The features in FIG. 3 that are common to FIGS. 1 and 2 are not discussed further.

According to FIG. 3, which shows a third example of the present invention, described is a system that is similar to the hot water injection system (FIG. 1), except that phase separator S100 is replaced with saturation column C100 having a top, a bottom, and a heat and/or mass transfer zone therebetween containing heat and mass transfer elements (such as trays or packing). The recirculated heated water stream 58 combines with makeup water stream 50 (which is added as required) and is fed as stream 64 to the top of the saturation column C100. The temperature and/or flow of stream 64 is adjusted to ensure that the stream 7 to the compressor stage is humidified to the pre-determined relative humidity at the pre-determined feed temperature. In this case, the excess liquid water 52 being removed from the bottom of the saturation column C100 is at a lower temperature than stream 7 because of the heat and mass transfer taking place within column C100. At least part of stream 60 may then optionally be recycled as part of the make-up water in stream 50. This saves costs as stream 60 is already at an increased pressure, and reduces waste.

The system depicted in FIG. 3 will now be explained in more detail with reference to Example 3 below which contains simulated data. This data was generated using a computer simulation package, Aspen Plus with version no. 10.

| Stream | 1 | 3 | 7 | 9 | 10 | 11 | 13 | 15 |
|---|---|---|---|---|---|---|---|---|
| Temp., ° C. | 40.0 | 40.0 | 40.0 | 140.9 | 101.1 | 40.0 | 40.0 | 40.0 |
| P, bar | 1.10 | 1.10 | 1.10 | 2.54 | 2.52 | 2.50 | 2.50 | 2.50 |
| Molar Flow, kmol/hr | 321.6 | 1042.9 | 1072.0 | 1072.0 | 1072.0 | 1072.0 | 1030.5 | 309.1 |
| Vap. Fract. | 1.00 | 1.00 | 1.00 | 1.00 | 1.00 | 0.96 | 1.00 | 1.00 |
| Mol. fract. Water | 0.0671 | 0.0412 | 0.0672 | 0.0672 | 0.0672 | 0.0672 | 0.0296 | 0.0296 |
| Relative humidity | 100% | 61% | 100% | 5% | 16% | 100% | 100% | 100% |
| Mol. wt. | 3.090 | 2.675 | 3.091 | 3.091 | 3.091 | 3.091 | 2.490 | 2.490 |

| Stream | 17 | 19 | 50 | 52 | 54 | 56 | 58 | 60 | 64 |
|---|---|---|---|---|---|---|---|---|---|
| Temp., ° C. | 40.0 | 40.0 | 40.0 | 33.1 | 33.1 | 51.4 | 51.4 | 40.0 | 51.1 |
| P, bar | 2.50 | 1.10 | 1.10 | 1.10 | 3.00 | 2.50 | 1.10 | 2.50 | 1.10 |
| Molar Flow, kmol/hr | 721.3 | 721.3 | 29.0 | 925.0 | 925.0 | 925.0 | 925.0 | 41.5 | 954.0 |
| Vap. Fract. | 1.00 | 1.00 | 0.00 | 0.00 | 0.00 | 0.00 | 0.00 | 0.00 | 0.00 |
| Mol. fract. Water | 0.0296 | 0.0296 | 1.0000 | 1.0000 | 1.0000 | 1.0000 | 1.0000 | 1.0000 | 1.0000 |
| Relative humidity | 100% | 44% | | | | | | | |
| Mol. wt. | 2.490 | 2.490 | | | | | | | |

Example 3 is the same as Example 1C but with the separator S100 replaced by a saturation column C100. So, the feed 1 is still saturated with a relative humidity of 100% at the stage inlet conditions (40° C., 1.1 bar), but the feed 1 also has a hydrogen gas flow which is 30% of full flow (321.6 kmol/hr). To maintain the molar flow through the compressor K102 at 100% (assuming it does not turn down beyond this), there is a significant molar flow in the recycle loop (17 and 19).

In this case, C100 contains 5 theoretical stages. At the top of the column C100 is fed a combined stream 64 of recirculated water flow stream 58 and makeup water stream 50. Compared to example 1C, the temperature of stream 58 is reduced as the column allows the water leaving the bottom to be colder than the gas leaving the top, so the inlet water does not need to be as hot to supply the same amount of heat to the gas. The temperature of stream 52 from the bottom of the saturation column is also reduced due to the heat and mass transfer that takes place in the column C100.

It can be seen from this example that the use of a saturation column increases the apparent molecular weight of the mixed feed 3 which may drop due to the use of a recycle. The relative humidity of the hydrogen gas feed to the compression stage is therefore maintained, which leads to optimal performance of the centrifugal compression stage.

Figure 4:
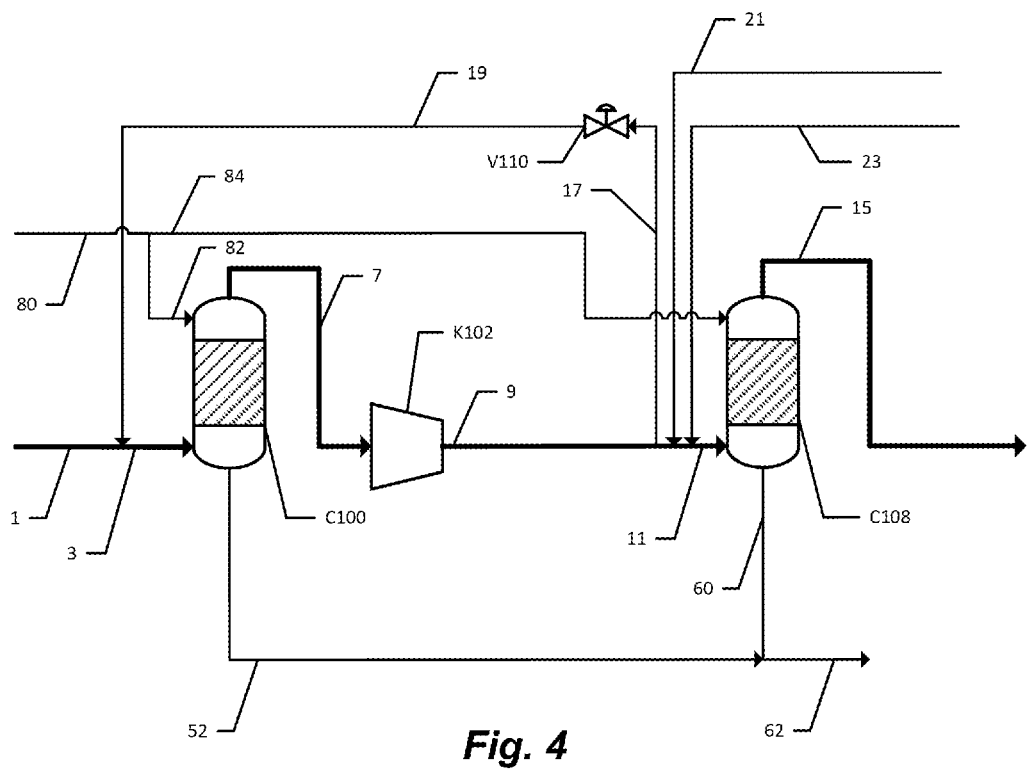
FIG. 4 is a simplified flowsheet of a further embodiment of the present invention involving using direct contact coolers.
Figure 5:
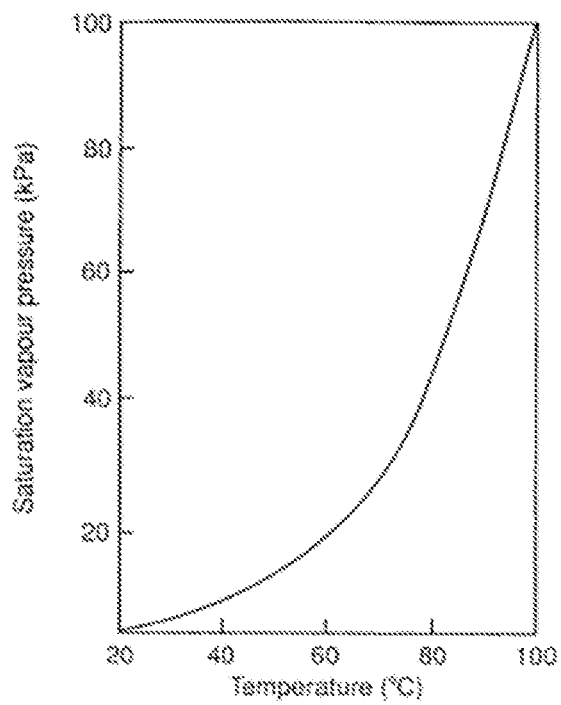
FIG. 5 is a plot of the saturation vapour pressure of water as a function of temperature.

The features in FIG. 4 that are common to FIGS. 1 to 3 are not discussed further.

According to FIG. 4, which shows a fourth example of the present invention, described is a system wherein the indirect heat exchangers and/or coolers of FIGS. 1-3 are replaced by direct contact coolers that contain heat and mass transfer elements.

In the system shown in FIG. 4, the direct contact coolers may also operate as saturation columns in certain circumstances. In this configuration, the hydrogen gas feed 1 is mixed with the recycled hydrogen gas in stream 19, when required. A recycle stream is taken from the discharge of the compressor stage K102 as stream 17 and reduced in pressure using valve V110 to the pre-determined feed pressure for compressor K102 to provide recycle stream 19. In this example, the recycle streams 17 and 19 remove and recycle hydrogen gas before any cooling step has taken place. The recycle stream 19 therefore contains hot recycled hydrogen gas.

Accordingly, the temperature of the mixed stream 3 that enters the direct contact cooler C100 varies according to the degree of recycle. In this example, cooling water feed stream 80 is split between the two coolers C100 and C108, with stream 82 being fed to the top of column C100 and stream 84 being fed to the top of column C108.

If the mixed stream 3 is below a certain temperature (which varies according to the degree of saturation and recycle), the overhead stream 7 and the cooling water return stream 52 will be cooler than the cooling water stream 82. If the mixed stream 3 is above a certain temperature, streams 7 and 52 will be hotter than the cooling water feed 82.

The variation in temperature can be maintained within a narrow temperature range by choosing an appropriate water flow and/or temperature of the water steam 82. These can be adjusted in real time to maintain a substantially constant temperature in the overhead stream 7 at the pre-determined feed temperature.

The temperature adjustment of the water streams 80, 82, and 84 may be achieved by mixing a warm cooling water return stream (not shown) from another part of the system with the cooling water streams 82 and/or 84, or by heating streams 80, 82 and 84 in a separate heat exchanger unit (not shown).

Following compression in the compressor K102, part of the hot compressed hydrogen stream 9 may be recycled as stream 17, where necessary, for stable operation of the compressor when stream 1 has reduced flowrates. Further streams may be added to the remaining hydrogen before it passes to the second cooler 108 as stream 11. These streams may be a recycle from the following stage (stream 23) or a dry hydrogen gas feed from hydrogen storage (stream 21). The cooler C108 behaves in the same way as cooler C100 depending on the temperature of feed stream 11. The cooling water return stream 60 from cooler C108 mixes with stream 52 from cooler C100 and enters the cooling water return system as stream 62.

The mole fraction of water in the hydrogen gas feed 1 may vary, and so the pre-determined relative humidity of the hydrogen gas feed 7 and 15 to the compressors is maintained through the addition of water to the hydrogen gas by streams 82 and 84 in the direct contact coolers C100 and C108. The contact between the water and hydrogen gas (together with sufficient heat) provides humidification.

The system depicted in FIG. 4 will now be explained in more detail with reference to three Examples 4A, 4B and 4C which contain simulated data. This data was generated using a computer simulation package, Aspen Plus with version no. 10.

Example 4A

| Stream | 1 | 3 | 7 | 9 | 11 | 15 | 17 | 19 |
|---|---|---|---|---|---|---|---|---|
| Temp., °C. | 40.0 | 40.0 | 40.0 | 140.9 | 140.9 | 40.0 | | |
| P, bar | 1.10 | 1.10 | 1.10 | 2.54 | 2.54 | 2.50 | | |
| Molar Flow, kmol/hr | 1000.0 | 1000.0 | 1071.9 | 1071.9 | 1071.9 | 1030.4 | 0.0 | 0.0 |
| Vap. Fract. | 1.00 | 1.00 | 1.00 | 1.00 | 1.00 | 1.00 | | |
| Mol. fract. Water | 0.0000 | 0.0000 | 0.0671 | 0.0671 | 0.0671 | 0.0296 | | |
| Relative humidity | 0% | 0% | 100% | 5% | 5% | 100% | | |
| Mol. wt. | 2.016 | 2.016 | 3.090 | 3.090 | 3.090 | 2.490 | | |

| Stream | 21 | 23 | 52 | 60 | 62 | 80 | 82 | 84 |
|---|---|---|---|---|---|---|---|---|
| Temp., °C. | | | 23.6 | 65.2 | 45.8 | 35.0 | 45.0 | 35.0 |
| P, bar | | | 1.10 | 2.54 | 1.10 | 3.00 | 3.00 | 3.00 |
| Molar Flow, kmol/hr | 0.0 | 0.0 | 1946.1 | 2215.5 | 4161.6 | 4192.0 | 2018.0 | 2174.0 |
| Vap. Fract. | | | 0.00 | 0.00 | 0.00 | 0.00 | 0.00 | 0.00 |
| Mol. fract. Water | | | 1.0000 | 1.0000 | 1.0000 | 1.0000 | 1.0000 | 1.0000 |
| Relative humidity | | | | | | | | |
| Mol. wt. | | | | | | | | |

In Example 4A, the hydrogen gas in feed 1 is at 100% flow but is dry with a relative humidity of 0% at the stage inlet conditions (40° C., 1.1 bar). Since the flow of feed 1 is already at 100%, no recycle streams (17 and 19) are added. The feed 1 is therefore identical to feed 3 which enters the direct contact cooler C100.

Since there is no other source of heat, the water stream 82 being fed to the top of cooler C100 must be heated in a heat exchanger (not shown) or taken from another source of hot water (not shown). In this example stream 82 is heated to 45° C.

The excess liquid water 52 removed from the cooler C100 has been cooled to 23.6° C. which is below the temperature of stream 7 and pre-determined feed temperature (40° C.). Thus, in this case the direct contact cooler C100 operates in the same way as a saturation column in the sense that heated water provides humidification of the hydrogen gas to the pre-determined relative humidity (100%) at the stage inlet conditions (40° C., 1.1 bar). The second direct contact cooler C108 provides the aftercooling for the compression stage K102. The liquid water stream 84 being fed to the top of the cooler C108 is at a temperature (35° C.) which is below the pre-determined feed temperature (40° C.).

Heat from the compressed hydrogen gas stream 11 is transferred to the cooling water from stream 84, and liquid water stream 60 leaves the bottom of the cooler having been warmed to 65.2° C. Part of water stream 60 may be recirculated to provide the hot water stream 82 to the first direct contact cooler C100 for humidification.

It can be seen from this example that the use of direct contact coolers increases the apparent molecular weight of the hydrogen gas in feed 7. The relative humidity of the hydrogen gas feed to the compression stage is therefore maintained, which leads to optimal performance of the centrifugal compression stage.

Example 4B

| Stream | 1 | 3 | 7 | 9 | | 15 | 17 | 19 |
|---|---|---|---|---|---|---|---|---|
| Temp., °C. | 40.0 | 40.0 | 40.0 | 140.9 | 140.9 | 40.0 | | |
| P, bar | 1.10 | 1.10 | 1.10 | 2.54 | 2.54 | 2.50 | | |
| Molar Flow, kmol/hr | 1072.0 | 1072.0 | 1072.0 | 1072.0 | 1072.0 | 1030.5 | 0.0 | 0.0 |
| Vap. Fract. | 1.00 | 1.00 | 1.00 | 1.00 | 1.00 | 1.00 | | |
| Mol. fract. Water | 0.0671 | 0.0671 | 0.0671 | 0.0671 | 0.0671 | 0.0296 | | |
| Relative humidity | 100% | 100% | 100% | 5% | 5% | 100% | | |
| Mol. wt. | 3.090 | 3.090 | 3.090 | 3.090 | 3.090 | 2.490 | | |

| Stream | 21 | 23 | 52 | 60 | 62 | 80 | 82 | 84 |
|---|---|---|---|---|---|---|---|---|
| Temp., °C. | | | 40.0 | 65.2 | 65.2 | 35.0 | 35.0 | 35.0 |
| P, bar | | | 1.10 | 2.54 | 1.10 | 3.00 | 3.00 | 3.00 |
| Molar Flow, kmol/hr | 0.0 | 0.0 | 0.5 | 2215.0 | 2215.5 | 2174.0 | 0.5 | 2173.5 |
| Vap. Fract. | | | 0.00 | 0.00 | 0.00 | 0.00 | 0.00 | 0.00 |
| Mol. fract. Water | | | 1.0000 | 1.0000 | 1.0000 | 1.0000 | 1.0000 | 1.0000 |
| Relative humidity | | | | | | | | |
| Mol. wt. | | | | | | | | |

Example 4B illustrates what happens when the hydrogen gas in feed 1 is already saturated with a relative humidity of 100% at the stage inlet conditions (40° C., 1.1 bar). In this case, the first direct contact cooler C100 does not need to do anything, and the water flow can be stopped (as shown by the flow of stream 82 being reduced to 0.5 kmol/hr), or it can be recirculated at the pre-determined feed temperature. The conditions around the second direct contact cooler C108 are the same as in example 4A.

It can be seen from this example that the direct contact coolers are used to maintain the temperature and relative humidity of the hydrogen gas feed 7 to the compressor, so when these are already at optimal levels, no heat needs to be added. Water is still added to the direct contact coolers, but due to the conditions it does not humidify the hydrogen gas feed since it is already fully saturated with water. This maintains the optimal performance of the centrifugal compression stage.

Example 4C

| Stream | 1 | 3 | 7 | 9 | 11 | 15 | 17 | 19 |
|---|---|---|---|---|---|---|---|---|
| Temp., °C. | 40.0 | 110.4 | 40.0 | 140.9 | 141.0 | 40.0 | 141.0 | 141.0 |
| P, bar | 1.10 | 1.10 | 1.10 | 2.54 | 2.54 | 2.50 | 2.54 | 1.10 |
| Molar Flow, kmol/hr | 321.6 | 1060.1 | 1072.0 | 1072.0 | 1054.9 | 1030.5 | 738.5 | 738.5 |
| Vap. Fract. | 1.00 | 1.00 | 1.00 | 1.00 | 1.00 | 1.00 | 1.00 | 1.00 |
| Mol. fract. Water | 0.0671 | 0.0566 | 0.0671 | 0.0671 | 0.0520 | 0.0296 | 0.0520 | 0.0520 |
| Relative humidity | 100% | 4% | 100% | 5% | 4% | 100% | 4% | 2% |
| Mol. wt. | 3.090 | 2.922 | 3.090 | 3.090 | 2.849 | 2.490 | 2.849 | 2.849 |

| Stream | 21 | 23 | 52 | 60 | 62 | 80 | 82 | 84 |
|---|---|---|---|---|---|---|---|---|
| Temp., °C. | 141.0 | 46.5 | 62.6 | 54.8 | 35.0 | 35.0 | 35.0 | |
| P, bar | 2.54 | 1.10 | 2.54 | 1.10 | 3.00 | 3.00 | 3.00 | |
| Molar Flow, kmol/hr | 0.0 | 721.4 | 1944.1 | 2029.4 | 3973.5 | 3961.0 | 1956.0 | 2005.0 |
| Vap. Fract. | | 1.00 | 0.00 | 0.00 | 0.00 | 0.00 | 0.00 | 0.00 |
| Mol. fract. Water | | 0.0296 | 1.0000 | 1.0000 | 1.0000 | 1.0000 | 1.0000 | 1.0000 |
| Relative humidity | | 2% | | | | | | |
| Mol. wt. | | 2.490 | | | | | | |

Example 4C illustrates the case where the hydrogen gas in feed 1 is saturated with a relative humidity of 100% at the stage inlet conditions (40° C., 1.1 bar) but has a reduced flow of 30% full flow. Recycle streams 17 and 19 provide recycled hot hydrogen gas to maintain the flow through the compression stage K102 as before at 100%. The result is that the hydrogen gas in the mixed feed 3 has a temperature of 110.4° C. which is far higher than the pre-determined feed temperature of 40° C.

Thus, in this Example, the first direct contact cooler C100 operates as a cooler for the mixed feed 3 which contains hot recycled hydrogen gas added from stream 19. The cooling water from stream 82 is heated by the hydrogen gas from the mixed stream 3 as it moves down the column of cooler C100. The hydrogen gas from the mixed stream 3 is cooled by the cooling water stream 82 to the pre-determined feed temperature of 40° C. in stream 7, before stream 7 is fed to the compressor K102.

Note that there is no need for the direct contact cooler C100 to humidify the hydrogen gas feed as the relative humidity is at 100% for the mixed stream 3 at the stage inlet conditions (40° C., 1.1 bar) because all of the hydrogen gas in mixed stream 3 (from feed 1 and from the recycle stream 19) is at a relative humidity of 100% for the pre-determined feed temperature of 40° C. This is because recycle stream 17 is reduced in pressure before it is cooled, so no condensation of water vapour has occurred before it is added to form mixed stream 3.

This Example also includes a hot recycle stream 23 from a downstream compression stage (not shown) that is added to the compression hydrogen gas stream 9 as part of stream 11 for feeding to the second direct contact cooler C108.

The second direct contact cooler C108 provides aftercooling for the compression stage K102, as well as cooling for the recycle steam 23 from the downstream compression stage (not shown). Cooler C108 heats the cooling water steam 84 being fed to the top of the column as in Examples 4A and 4B.

It can be seen from this example that the use of direct contact coolers allows the mixed feed 3, which is heated by a hot recycle, to be cooled back to the feed temperature of the compression stage. The apparent molecular weight of the hydrogen gas in feed 7 is therefore unchanged, and once cooled to the stage inlet conditions the relative humidity of the hydrogen gas feed is maintained at 100%. This leads to optimal performance of the centrifugal compression stage.

While the invention has been described with reference to the preferred embodiments depicted in the figures, it will be appreciated that various modifications are possible within the spirit or scope of the invention as defined in the following claims.

In this specification, unless expressly otherwise indicated, the word "or" is used in the sense of an operator that returns a true value when either or both of the stated conditions are met, as opposed to the operator "exclusive or" which requires only that one of the conditions is met. The word "comprising" is used in the sense of "including" rather than to mean "consisting of".

All prior teachings above are hereby incorporated herein by reference. No acknowledgement of any prior published document herein should be taken to be an admission or representation that the teaching thereof was common general knowledge in Australia or elsewhere at the date thereof.

The invention claimed is:

1. A process for producing compressed hydrogen gas, said process comprising:
   electrolysing water to produce hydrogen gas; and
   compressing said hydrogen gas in a multistage compression system to produce said compressed hydrogen gas,
   wherein the multistage compression system comprises at least one centrifugal compression stage, and the hydrogen gas is fed to the centrifugal compression stage at a pre-determined feed temperature and pressure and having a pre-determined relative humidity, and
   wherein the process comprises adding water and heat to the hydrogen gas upstream of the centrifugal compression stage, as required, to humidify the hydrogen gas to the pre-determined relative humidity.

2. The process according to claim 1, wherein the pre-determined relative humidity is from 70 up to 100%.

3. The process according to claim 1, wherein the water is added in excess to humidify the hydrogen gas, and the pre-determined relative humidity is 100%.

4. The process according to claim 1, wherein the hydrogen gas is humidified by:
   determining a mole fraction of water in the hydrogen gas upstream of the centrifugal compression stage;
   injecting water into the hydrogen gas at a flowrate and temperature,
   wherein the flowrate and temperature of the water being injected is controlled as required based on the mole fraction of water.

5. The process according to claim 1, wherein the pre-determined feed temperature is from 20 to 60° C.

6. The process according to claim 1, wherein the hydrogen gas being fed to the centrifugal compression stage has an apparent molecular weight in a range from 2.2 to about 3.5.

7. The process according to claim 1, wherein the centrifugal compression stage is a first or initial stage in the multistage compression system.

8. The process according to claim 1, wherein the compressed hydrogen gas is consumed in at least one downstream process, and wherein during periods when more hydrogen gas is produced by the electrolysis than is required by the downstream process(es), the process comprises feeding excess compressed hydrogen gas to storage, optionally after further compression; and
   wherein during periods when more hydrogen gas is required by the downstream process(es) than is produced by the electrolysis, the process comprises withdrawing the compressed hydrogen gas from the storage and, after suitable pressure reduction, feeding a reduced pressure hydrogen gas to a stage of the multistage compression system.

9. The process according to claim 1, wherein the centrifugal compression stage comprises an outlet end and a feed end, and the hydrogen gas being fed to the feed end contains recycled hydrogen gas taken from the outlet end after suitable pressure reduction.

10. The process according to claim 1, wherein the hydrogen gas is fed to the centrifugal compression stage at the pre-determined feed temperature by controlling temperature and/or flow rate of the water being added.

11. The process according to claim 1, wherein the multistage compression system comprises a first section and at least one further section downstream of the first section.

12. The process according to claim 1, wherein all stages of the multistage compression system are centrifugal compression stages.

13. The process according to claim 1, wherein the water and the heat are added as steam to form a combined steam/hydrogen stream.

14. The process according to claim 13, wherein the steam is de-superheated steam.

15. The process according to claim 14, wherein liquid water is added to superheated steam to provide the de-superheated steam.

16. The process according to claim 13, wherein the combined steam/hydrogen stream passes through a phase separator to remove liquid water from the hydrogen gas which is then fed to the centrifugal compression stage.

17. The process according to claim 1, wherein the water and the heat are added as liquid water to produce a two-phase combined stream.

18. The process according to claim 17, wherein the two-phase combined stream passes through a static mixer prior to being fed to a phase separator to remove excess liquid water from the hydrogen gas which is then fed to the centrifugal compression stage.

19. The process according to claim 18, comprising:
pumping the liquid water from the phase separator to produce pumped liquid water;
cooling compressed hydrogen gas by indirect heat exchange against the pumped liquid water in a cooler to produce cooled compressed hydrogen gas and warmed liquid water;
reducing the pressure of the warmed liquid water to produce reduced pressure recycle water; and
using said reduced pressure recycle water as at least part of the liquid water being added to the hydrogen gas to form the two-phase combined stream.

20. The process according to claim 19 comprising adding make-up water to the reduced pressure recycle water as required.

21. The process according to claim 1, wherein the water is in the form of liquid water, said process comprising:
humidifying the hydrogen gas with the liquid water in a saturation column having a top, a bottom and at least one heat and/or mass transfer zone located therebetween;
removing humidified hydrogen gas from the top of the saturation column and feeding the humidified hydrogen gas to the centrifugal compression stage; and
removing excess liquid water from the bottom of the saturation column.

22. The process according to claim 21, comprising:
pumping the liquid water from the saturation column to produce pumped liquid water;
cooling compressed hydrogen gas by indirect heat exchange against the pumped liquid water in a cooler to produce cooled compressed hydrogen gas and warmed liquid water;
reducing the pressure of the warmed liquid water to produce reduced pressure recycle water; and
using said reduced pressure recycle water as at least part of the liquid water being used to humidify the hydrogen gas in the saturation column.

23. The process according to claim 22 comprising adding make-up water to the hydrogen gas or reduced pressure recycle water, as required.

24. The process according to claim 1, wherein the water is in the form of liquid water, said process comprising:
humidifying the hydrogen gas with the liquid water in a first direct contact cooler having a top, a bottom and at least one heat and/or mass transfer zone located therebetween;
removing humidified hydrogen gas from the top of the first direct contact cooler and feeding the humidified hydrogen gas to the centrifugal compression stage for compression to produce compressed hydrogen gas; and
removing excess liquid water from the bottom of the first direct contact cooler;
recycling as required a portion of the compressed hydrogen gas produced in the centrifugal compression stage to the first direct contact cooler after suitable pressure reduction and without any cooling.

25. The process according to claim 24, wherein the centrifugal compression stage is an initial stage or an intermediate stage of the multistage compression system, said process comprising:
humidifying compressed hydrogen gas from the centrifugal compression stage with liquid water in a second direct contact cooler having a top, a bottom and at least one heat and/or mass transfer zone located therebetween;
removing humidified hydrogen gas from the top of the second direct contact cooler and feeding the humidified hydrogen gas to a further centrifugal compression stage for compression to produce further compressed hydrogen gas; and
removing excess liquid water from the bottom of the second direct contact cooler.

26. The process according to claim 25, comprising recycling as required a portion of the further compressed hydrogen gas produced in the further centrifugal compression stage to the hydrogen gas feed to the second direct contact cooler after suitable pressure reduction and without any cooling.

27. The process according to claim 26, wherein hydrogen from storage is added to the first and/or second direct contact cooler as required.

28. The process according to claim 26, wherein the temperature and/or flow rate of the liquid water being added to the first and/or second direct contact cooler is determined based on the temperature and/or relative humidity of the hydrogen gas being fed to the (further) further centrifugal compression stage.

29. An apparatus for producing compressed hydrogen gas, the apparatus comprising:
a plurality of electrolysers arranged in parallel for electrolysing water to provide hydrogen gas;
an electricity generation system for generating electricity to power the plurality of electrolysers, the electricity generation system being in electrically conductive communication with the plurality of electrolysers;
a multistage compression system for compressing the hydrogen gas to provide a compressed hydrogen gas, the multistage compression system comprising a feed end, an outlet end and at least one centrifugal compression stage having a pre-determined feed temperature and pressure and wherein hydrogen gas is fed to the feed end having a pre-determined relative humidity, the feed end being in fluid flow communication with the plurality of electrolysers via a feed header;
a saturator for adding water and heat to the hydrogen gas upstream of the centrifugal compression stage as required for humidifying the hydrogen gas to the pre-determined relative humidity at the pre-determined feed temperature and pressure; and
a separator for removing excess liquid water from the hydrogen gas upstream of the centrifugal compression stage.

30. The apparatus according to claim 29, wherein the separator is a phase separator.

31. The apparatus according to claim 29, wherein the saturator and separator are combined as a single unit in the form of a saturation column having a top, a bottom and at least one heat and/or mass transfer zone located therebetween.

32. The apparatus according to claim 29, wherein the saturator and separator are combined as a single unit in the form of a direct contact cooler having a top, a bottom and at least one heat and/or mass transfer zone located therebetween, and the apparatus comprises:
   a recycle system for recycling a portion of the hydrogen gas from a product end to a feed end of the centrifugal compression stage, wherein the recycled portion of the hydrogen gas is removed from the product end and is reduced by a valve to the pre-determined feed pressure at the feed end without any cooling.

33. The apparatus according to claim 29, comprising:
   a water recycle system comprising:
      a pump for pumping the excess liquid water from the separator;
      a cooler in fluid flow communication with the pump, wherein the cooler is configured for cooling compressed hydrogen gas from the outlet of the centrifugal compression stage by indirect heat exchange against the pumped excess liquid water; and
      a return line in fluid flow communication with the cooler, the return line comprising a valve which feeds the excess liquid water, after suitable pressure reduction, to the saturator to form at least part of the water and heat to be added to the hydrogen gas.

* * * * *